US006975964B2

(12) United States Patent
Reichler et al.

(10) Patent No.: US 6,975,964 B2
(45) Date of Patent: Dec. 13, 2005

(54) METHOD AND SYSTEM FOR DETERMINING AND MONITORING THE DISPENSING EFFICIENCY OF A FUEL DISPENSING POINT IN A SERVICE STATION ENVIRONMENT

(75) Inventors: Donald S. Reichler, West Simsbury, CT (US); Adriano Baglioni, South Windsor, CT (US); Thomas C. Zalenski, Avon, CT (US); Robert P. Hart, East Hampton, CT (US); Richard K. Lucas, Enfield, CT (US)

(73) Assignee: Veeder-Root Company, Simsbury, CT (US)

( * ) Notice: Subject to any disclaimer, the term of this patent is extended or adjusted under 35 U.S.C. 154(b) by 145 days.

(21) Appl. No.: 10/684,258

(22) Filed: Oct. 11, 2003

(65) Prior Publication Data

US 2005/0087558 A1 Apr. 28, 2005

(51) Int. Cl.[7] .............................................. G06F 19/00
(52) U.S. Cl. ...................................... 702/182; 222/231
(58) Field of Search ............................... 702/182, 183, 702/184; 222/231, 232, 236, 240, 241, 244, 222/639; 73/40.5 R, 40.5

(56) References Cited

U.S. PATENT DOCUMENTS 5,170,657 A 12/1992 Maresca, Jr. et al. .... 73/40.5 R
5,375,455 A 12/1994 Maresca, Jr. et al. .... 73/40.5 R
5,415,033 A 5/1995 Maresca, Jr. et al. .... 73/40.5 R
5,871,651 A 2/1999 McSpadden et al. ......... 210/739
6,227,409 B1 5/2001 Brown .......................... 222/1
2001/0039978 A1 * 11/2001 Hart et al. .................... 141/59

FOREIGN PATENT DOCUMENTS

EP 0473818 3/1992

* cited by examiner

*Primary Examiner*—Marc S. Hoff
*Assistant Examiner*—Edward Raymond
(74) *Attorney, Agent, or Firm*—Withrow & Terranova, PLLC

(57) ABSTRACT

Determining a maximum dispensing efficiency of a dispensing point in a fuel dispenser and determining if a dispensing point has a blockage and/or a performance problem if the maximum dispensing efficiency is less than expected. The maximum dispensing efficiency is calculated by determining the dispensing events exhibiting the lowest time for dispensed volume from a set of volume and time pair measurements for the dispensing point. The dispensing events exhibiting the lowest time for dispensed volume that are used to determine the maximum dispensing efficiency are taken from dispensing events where the amount of dead time, the time between the activation of a fuel dispensing event and the engaging of a nozzle and the time between the disengaging of the nozzle and the deactivation of the dispensing event, and customer or pre-pay transaction controlled reduced flow rates are minimized. In this manner, volume and time data that include more than the minimum amount of dead time in a dispensing event are not used in the determination of the maximum dispensing efficiency.

38 Claims, 18 Drawing Sheets

METHOD AND SYSTEM FOR DETERMINING AND MONITORING THE DISPENSING EFFICIENCY OF A FUEL DISPENSING POINT IN A SERVICE STATION ENVIRONMENT

FIELD OF THE INVENTION

The present invention relates to a system and method for determining the dispensing efficiency of fuel dispensers and/or fuel dispensing points in a service station environment to determine if the fuel dispensers/fuel dispensing points contain a blockage and/or performance problem that affects flow rate.

BACKGROUND OF THE INVENTION

Service stations are comprised of a plurality of fuel dispensers that dispense fuel to motor vehicles A conventional exemplary fueling environment 10 is illustrated in FIGS. 1 and 2. Such a fueling environment 10 may comprise a central building 12, a car wash 14, and a plurality of fueling islands 16.

The central building 12 need not be centrally located within the fueling environment 10, but rather is the focus of the fueling environment 10, and may house a convenience store 18 and/or a quick serve restaurant (QSR) 20 therein. Both the convenience store 18 and the quick serve restaurant 20 may include a point-of-sale 22, 24, respectively. The central building 12 may further house a site controller (SC) 26, which in an exemplary embodiment may be the G-SITE® sold by Gilbarco Inc. of Greensboro, N.C. The site controller 26 may control the authorization of dispensing events and other conventional activities as is well understood. The site controller 26 may be incorporated into a point-of-sale, such as point of sale 22, if needed or desired. Further, the site controller 26 may have an off-site communication link 28 allowing communication with a remote location for credit/debit card authorization, content provision, reporting purposes or the like, as needed or desired. The off-site communication link 28 may be routed through the Public Switched Telephone Network (PSTN), the Internet, both, or the like, as needed or desired.

The car wash 14 may have a point-of-sale 30 associated therewith that communicates with the site controller 26 for inventory and/or sales purposes. The car wash 14 alternatively may be a stand-alone unit. Note that the car wash 14, the convenience store 18, and the quick serve restaurant 20 are all optional and need not be present in a given fueling environment.

The fueling islands 16 may have one or more fuel dispensers 32 positioned thereon. Each fuel dispenser 32 may have one or more fuel dispensing points. The term “dispensing point” can be used interchangeably with fuel dispenser 32 for the purposes of this application. A dispensing point 32 is a delivery point for fuel. The fuel dispensers 32 may be, for example, the ECLIPSE® or ENCORE®) sold by Gilbarco Inc. of Greensboro, N.C. The fuel dispensers 32 are in electronic communication with the site controller 26 through a LAN or the like.

The fueling environment 10 also has one or more underground storage tanks 34 adapted to hold fuel therein. As such, the underground storage tank 34 may be a double-walled tank. Further, each underground storage tank 34 may include a liquid level sensor or other sensor 35 positioned therein. The sensors 35 may report to a tank monitor (TM) 36 associated therewith. The tank monitor 36 may communicate with the fuel dispensers 32 (either through the site controller 26 or directly, as needed or desired) to determine amounts of fuel dispensed, and compare fuel dispensed to current levels of fuel within the underground storage tanks 34 to determine if the underground storage tanks 34 are leaking. In a typical installation, the tank monitor 36 is also positioned in the central building 12, and may be proximate to the site controller 26.

The tank monitor 36 may communicate with the site controller 26 and further may have an off-site communication link 38 for leak detection reporting, inventory reporting, or the like, which may take the form of a PSTN, the Internet, both, or the like. As used herein, the tank monitor 36 and the site controller 26 are site communicators to the extent that they allow off-site communication and report site data to a remote location. The site controller 26 and the tank monitor 36 are typically two separate devices in a service station environment.

In addition to the various conventional communication links between the elements of the fueling environment 10, there are conventional fluid connections to distribute fuel about the fueling environment as illustrated in FIG. 2. The underground storage tanks 34 may each be associated with a vent 40 that allows over-pressurized tanks to relieve pressure thereby. A pressure valve (not shown) is placed on the outlet side of each vent 40 to open to atmosphere when the underground storage tank 34 reaches a predetermined pressure threshold. Additionally, under-pressurized tanks may draw air in through the vents 40. In an exemplary embodiment, two underground storage tanks 34 exist—one a low octane tank (87 grade for example) and one a high octane tank (93 grade for example) Blending may be performed within the fuel dispensers 32, as is well understood, to achieve an intermediate grade of fuel. Alternatively, additional underground storage tanks 34 may be provided for diesel and/or an intermediate grade of fuel (not shown).

Pipes 42 connect the underground storage tanks 34 to the fuel dispensers 32. Pipes 42 may be arranged in a main conduit 44 and branch conduit 46 configuration, where the main conduit 44 carries the fuel that is pumped by a fuel pump, such as a submersible turbine pump (not shown) for example, from the underground storage tanks 34 to the branch conduits 46, and the branch conduits 46 connect to the fuel dispensers 32. Typically, the pipes 42 are double-walled pipes comprising an inner conduit and an outer conduit. Fuel flows in the inner conduit to the fuel dispensers, and the outer conduit insulates the environment from leaks in the inner conduit. For a better explanation of such pipes and concerns about how they are connected, reference is made to Chapter B13 of PIPING HANDBOOK, 7$^{th}$ edition, copyright 2000, published by McGraw-Hill, which is hereby incorporated by reference.

As better illustrated in FIG. 3, each fuel dispenser 32 is coupled to a branch conduit 46 to receive fuel from the underground storage tank 34 via the main conduit 44. The fuel dispenser 32 is coupled to a branch conduit 46 that is coupled to the main conduit 44 to receive fuel As fuel enters into the fuel dispenser 32 via the branch conduit 46, the fuel typically first encounters a shear valve 48. The shear valve 48 is designed to cut off the fuel delivery piping 47 internal to the fuel dispenser 32 from the branch conduit 46 in the event that an impact is made on the fuel dispenser 32 for safety reasons. The fuel delivery piping 47 carries the fuel inside the fuel dispenser 32 to its various components before being delivered to a vehicle. As is well known in the fuel dispensing industry, the shear valve 48 is designed to shut off the supply of fuel from the underground storage tank 34 and the branch conduit 46 if the fuel dispenser 32 is impacted to ensure that any damaged internal fuel supply piping 47 due to an impact cannot continue to receive fuel from the branch conduit 46 that may then be leaked to the ground, the customer, and/or the environment.

After the fuel leaves the shear valve 48, the fuel typically passes through a flow control valve 49 located inline to the fuel supply piping 47. The flow control valve 49 may be used to control the flow of fuel into the fuel dispenser 32. The flow control valve 49 may be a two stage valve so that the fuel dispenser 32 controls the flow of fuel in a slow mode at the beginning of a dispensing event and at the end of the transaction (in the case of a prepaid fuel transaction), and a fast mode for fueling during steady state after slow flow mode is completed.

After the fuel leaves the flow control valve 49 in the fuel supply piping 47, the fuel may encounter a filter 50 to filter out any contaminants in the fuel before the fuel reaches the flow meter 52 that is typically located on the outlet side of the filter 50. The filter 50 helps to prevent contaminates from passing to the fuel flow meter 52 and the customer's fuel tank. Contaminates can cause a fuel flow meter 52 to malfunction and/or become un-calibrated if the meter 52 is a positive displacement meter, since the contaminate can scrub the internal housing of the meter 52 and increase the volume of the meter 52. If a filter 50 becomes clogged or blocked in any way, either wholly or partially, this will impede the flow of fuel from the fuel dispenser 32 and thereby reduce the maximum throughput/flow rate of the fuel dispenser 32. The maximum throughput of the fuel dispenser 32 is the maximum flow rate at which the fuel dispenser 32 can deliver fuel to a vehicle if no blockages or performance problems exist.

The filter 50 is changed periodically by service personnel during service visits, and is typically replaced at periodic intervals or when a fuel dispenser 32 is noticeably not delivering fuel at a fast enough flow rate. Because the filter 50 is changed in this manner, a fuel dispenser 32 may encounter unusual and unintended low flow rates for a period of time before they are noticed by the station operators and/or before service personnel replace such filters 50 during periodic service visits. There are also other components of a fuel dispenser 32 in addition to the filter 50 than may cause a fuel dispenser 32 to not deliver fuel at the intended flow rate, such as a defective or blocked valve 48, meter 52, hose 58, nozzle 60, or any other component in the fuel supply line 47 of the fuel dispenser 32.

After the fuel leaves the filter 50, the fuel enters into the fuel flow meter 52 to measure the amount of volumetric flow of fuel. The amount of volumetric flow of fuel is communicated to a controller 54 in the fuel dispenser 32 via a pulse signal line 56 from the fuel flow meter 52. The controller 54 typically transforms the pulses from the pulse signal line 56 into the total number of gallons dispensed and the total dollar amount charged to the customer, which is then typically displayed on LCD displays (not shown) on the fuel dispenser 32 visible to the customer. Note that the flow control valve 49 discussed above may be located on either the inlet or outlet side of the fuel flow meter 52.

After the fuel leaves the fuel flow meter 52, the fuel is delivered to the fuel supply piping 47 on the outlet side of the fuel flow meter 52 where it then reaches a hose 58. The hose 58 is coupled to a nozzle 60. The customer controls the flow of fuel from the hose 58 and nozzle 60 by engaging a nozzle handle (not shown) on the nozzle 60 as is well known.

If there is any blockage, either partially or wholly, in the fuel supply piping 47 within the fuel dispenser 32 or any components located inline to the fuel supply piping 47, the fuel cannot be delivered by the fuel dispenser 32 to a vehicle at the maximum throughput or flow rate that the fuel dispenser 32 would be capable of performing if no blockage existed. A blockage in the fuel supply piping 47 can occur within the piping 47 itself or as a result of a blockage in any of the components that are located inline to the fuel supply piping 47, including but not limited to the shear valve 48, the flow control valve 49, the filter 50, the fuel flow meter 52, the hose 58, and the nozzle 60. Also, if the submersible turbine pump that pumps fuel from the underground storage tank 34 to the fuel dispensers 32 is suffering from reduced performance and/or pumping rate, this may result in fuel dispensers 32 not delivering the maximum throughput or flow rate of fuel.

Any decline in the submersible turbine pump performance, a blockage in the fuel supply piping 47, or a blockage in components located inline to the fuel supply piping 47 may cause the fuel dispenser 32 to either not deliver fuel at all or at a reduced rate, thereby reducing the throughput efficiency of the fuel dispenser 32 and possibly requiring a customer to spend more time refueling a vehicle. The customer may be frustrated and therefore not visit the same service station for his or her fueling needs. The reduced throughput of the fuel dispenser 32 may also cause other customers to wait longer for a fueling position thereby resulting in lost revenue in terms of lost opportunity revenues. If the fuel dispenser 32 throughput efficiency can be measured and then compared against a normal throughput in an automated manner, fuel dispenser 32 throughput problems can be detected shortly after their occurrence to allow a station operator and/or service personnel to remedy the problem more quickly.

Until the present invention, one method known for monitoring the throughput efficiency of a fuel dispenser 32 is to calculate the flow rate of the fuel dispenser 32. The flow rate is the amount of fuel delivered by the fuel dispenser 32, as measured by the fuel flow meter 32, over the period of time that the fuel was flowing. For example, if a fuel dispenser 32 delivers ten gallons of fuel to a vehicle in a two minute dispensing transaction, the flow rate of the fuel dispenser 32 is five gallons per minute. The fuel dispenser 32 may determine the flow rate by dividing the volume of fuel dispensed, as measured by the fuel flow meter 52, by time, or the flow rate may be determined manually by dividing the volume of fuel delivered as indicated by the fuel dispenser 32 volume display by time. However, with these techniques, several issues can occur which will inaccurately reduce the measured flow rate from the true maximum flow rate capability of the fuel dispenser 32. For example, the nozzle may not be fully engaged during the entire dispensing event thereby reducing the volume throughput and also the calculated flow rate. If the fuel dispenser 32 were to start a timer when performing a flow rate calculation based on the activation and deactivation of the fuel dispenser 32, the timer may start before fuel flow begins thereby causing the time factor in the flow rate calculation to include what is known as "dead time."

FIG. 4 illustrates an example of a typical dispenser fueling transaction event or more simply called "dispensing event" at a fuel dispenser 32 showing volume of fuel dispensed versus time to illustrate the concept of "dead time." At the beginning of a dispensing event, labeled as "Dispense Start", the customer has initiated a dispensing event at a fuel dispenser 32, but has not yet engaged the nozzle 60 handle.

The customer may begin a dispensing event by lifting a nozzle 60 holder lift (not shown) on the fuel dispenser 32 or by pressing a button. After the customer begins the dispensing event, the tank monitor 36 and/or site controller 26 receives the "Dispense Start" message that indicates the dispensing event start time and fueling point number or name. After "Dispense Start" and before the nozzle 60 handle is engaged to begin fuel flow, time passes for the dispensing event even though fueling is not yet occurring. Once the customer engages the nozzle 60, fuel flow begins which is labeled as "Flow Start" in FIG. 4. Dispensing "Flow Start" information is typically not made available to the tank monitor 36, the site controller 26, and/or another control system. The time between the "Dispense Start" and the "Flow Start" is known as "dead time," where fuel is not flowing even though the dispensing event is active at the fuel dispenser 32. After "Flow Start," fueling occurs and the customer may even discontinue fueling during this period of time on purpose or because of a nozzle 60 snap also causing "dead time" in the middle of a dispensing event, which is not illustrated in FIG. 4. The customer may reduce the rate of fueling by not fully engaging the nozzle 60 handle or a pre-pay transaction may cause automatic slow down of the rate at the end of fueling, which are not "dead time" since some fuel is flowing, but these also cause the flow rate of the fuel dispenser 32 to be reduced from its maximum flow rate.

When the customer desires to end the dispensing event, the customer will disengage the nozzle 60 handle (labeled as "Flow End") and then deactivate the fuel dispenser 32. This deactivation causes a "Dispense End" message to occur. This message is received by the tank monitor 36, the site controller 26, and/or another control system, and indicates the ending time of the dispensing event, the fueling point number or name, and the total amount and/or running totalizer amount of fuel dispensed. The time between disengaging the nozzle 60 handle and deactivating the fuel dispenser 32 is also "dead time." As you can see in FIG. 4, the flow rate of the fuel dispenser 32 as measured using the "Dispense Start" and "Dispense End" messages will be lower than the actual flow rates that occur between "Flow Start" and "Flow End" times due to the dead time and due to any discontinuing or reduced engaging of the nozzle 60 handle by the customer or automatically reduced flow during the dispensing event. Therefore, it is not possible to ensure that a reduced flow rate measured using the "Dispense Start" and "Dispense End" messages is caused by a blockage in the fuel supply piping 47 or a problem in performance with a fuel pump, rather than such reduced flow rate, as measured, occurring as a result of dead time during a dispensing event by any or all of the aforementioned causes FIG. 5 further illustrates the fact that the flow rates as determined using "Dispense Start" and "Dispense End" messages from the fuel dispenser 32 cannot be used effectively to measure the performance of the fuel dispenser 32 to determine if a blockage or performance problem exists. As illustrated in FIG. 5, 1,259 dispensing events were monitored for a fuel dispenser 32 that had no known blockages or performance problems over a sixteen-day period. This monitoring consisted of determining the flow rate in gallons per minute (GPM) using the "Dispense Start" and "Dispense Ends" events for each of the 1,259 dispensing events Each dot in the table illustrated in FIG. 5 represents a single flow rate measurement for the fuel dispenser 32. As can easily been seen from FIG. 5, the flow rates of the fuel dispenser 32 ranged from less than 1 GPM to over 8 GPM, and the flow rates were fairly evenly distributed between these two outer boundaries. Therefore, it is impossible to determine if a blockage and/or performance issue exists at a fuel dispenser 32 from using a flow rate calculation as illustrated in FIG. 5 since a full range of flow rates is possible for a correctly operating fuel dispenser 32.

Therefore, there exists a need to determine if a fuel dispenser 32 has a performance and/or blockage issue that is preventing the fuel dispenser 32 from dispensing the maximum flow rate possible even though the commonly available information from a dispensing event messages includes dead time and/or time of purposefully reduced dispensing flow rates.

SUMMARY OF THE INVENTION

The present invention relates to a system and method for determining the dispensing throughput of fuel dispensers in a service station environment using commonly available dispensing event information wherein the dead time and flow rate variability included in the information of the dispensing event is reduced and/or eliminated.

The present invention calculates the maximum dispensing efficiency of a fuel dispenser using the dispensing event information even though the dispensing event information includes dead time and/or purposefully reduced dispensing rates by a customer or due to automated prepay transaction flow reduction. A control system receives the dispensing event information for fuel dispensers and calculates what is known as a "maximum dispensing efficiency curve." From this maximum dispensing efficiency curve, the control system can determine the maximum possible flow rate of a dispensing point, the minimum amount of "dead time," of a dispensing point, or both, called the "maximum dispensing efficiency." The "maximum dispensing efficiency" calculation is used to detect the difference between true blockages and/or performance issues versus reduced flow rates caused by other means, such as the customer varying the flow rate via the nozzle, nozzle snaps, or performance problems with the fuel pump used to pump fuel from an underground storage tank to a fuel dispenser.

In one embodiment, the "best of bins" mathematical technique is used to determine the maximum dispensing efficiency curve from a sample set of volume and time pair measurements for a dispensing point. Each volume and time pair measurement is comprised of the volume of fuel dispensed over the measured amount of time for one dispensing event. The slope of the maximum dispensing efficiency curve and/or the minimum "dead time" is calculated to arrive at a maximum dispensing efficiency for the dispensing point. This maximum dispensing efficiency can be further analyzed to determine if the dispensing point contains a true blockage and/or performance problem.

In another embodiment, an "iterative fit" mathematical technique is used to determine the maximum dispensing efficiency curve from the sample set of volume and time pair measurements for a dispensing point. The slope of the maximum dispensing efficiency curve is calculated to arrive at a maximum dispensing efficiency for the dispensing point. This maximum dispensing efficiency can be further analyzed to determine if the dispensing point contains a true blockage and/or performance problem.

In another embodiment, a "Hough" mathematical technique is used to determine the maximum dispensing efficiency curve, and may be used as a pre-filtering technique for the other mathematical techniques of determining the maximum dispensing efficiency curve. The slope of the maximum dispensing efficiency curve and/or the minimum "dead time" is calculated to arrive at a maximum dispensing efficiency for the dispensing point. This maximum dispensing efficiency can be further analyzed to determine if the dispensing point contains a true blockage and/or performance problem.

If the control system determines that the maximum dispensing efficiency for a dispensing point is less that it should be, this is a result of a blockage and/or performance problem at the fuel dispenser, since the maximum dispensing efficiency cureve has essentially removed the inclusion of "dead time" from the calculation. In this instance, the control system can generate an alarm, send a message to a site controller and/or tank monitor, notify an operator and/or service personnel, and/or send a message to an off-site system.

The control system may use a number of techniques for determining if the maximum dispensing efficiency of a dispensing point indicates a blockage or performance problem. The control system may compare the maximum dispensing efficiency of a dispensing point to a threshold value stored in memory or calculated in real time according to a formula, The control system may compare the maximum dispensing efficiency of a dispensing point to all other maximum dispensing efficiencies for all other dispensing points. The control system may compare the currently calculated maximum dispensing efficiency of a dispensing point to past calculated maximum dispensing efficiencies for the dispensing point to determine if an anomaly exists.

Those skilled in the art will appreciate the scope of the present invention and realize additional aspects thereof after reading the following detailed description of the invention in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 6:
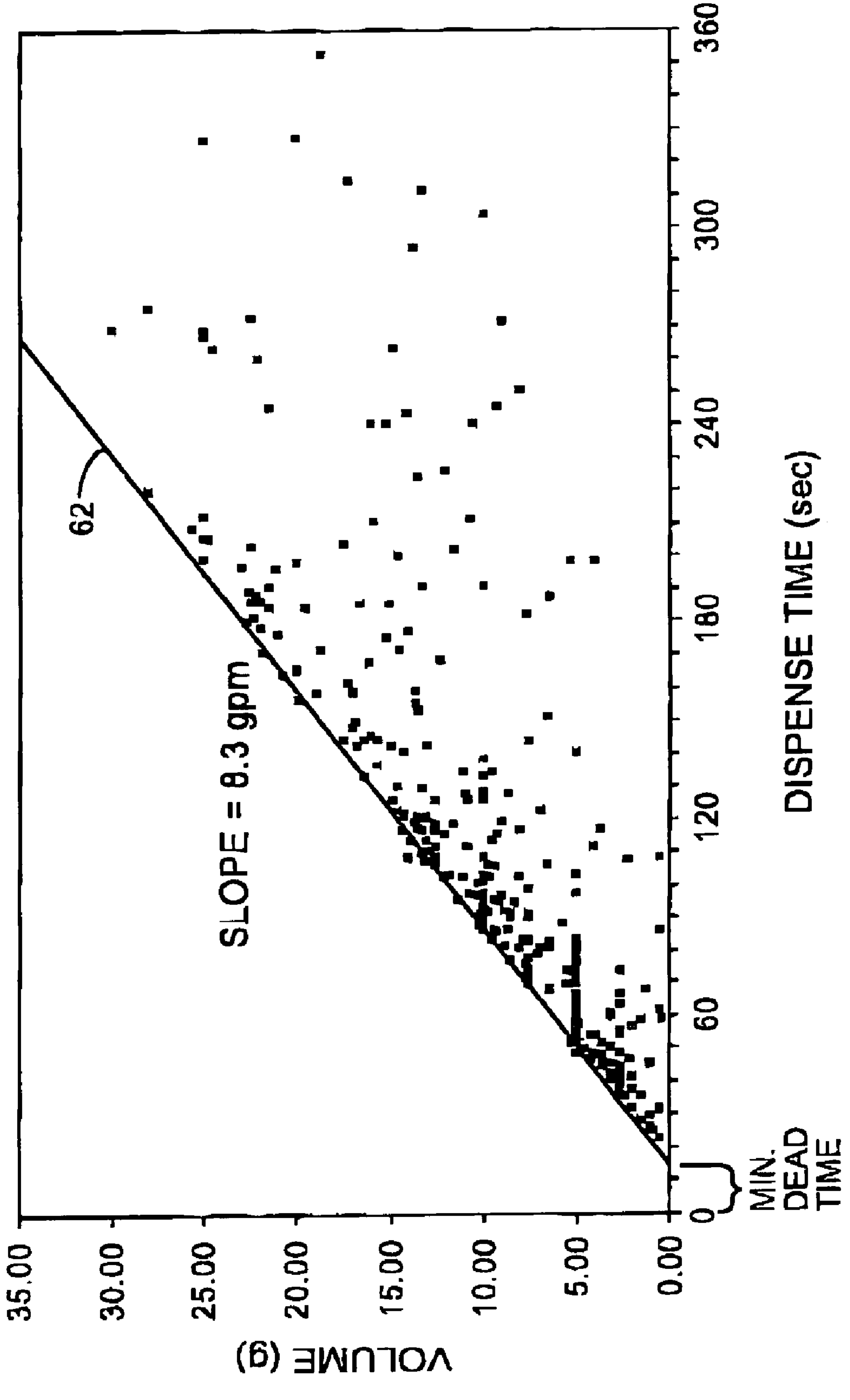
FIG. 6 illustrates one embodiment of a maximum dispensing efficiency curve for a dispensing point.

FIG. 6 illustrates a maximum dispensing efficiency curve for a fuel dispenser 32, using the dispensing events (i.e.—the "Dispensing Start" and "Dispensing End" events) and measured volume and time pairs even though the dispensing events include "dead time" and/or purposefully reduced dispensing rates by a customer or by other automated means. Each volume and time pair measurement is illustrated in FIG. 6 as a single data point in a two dimensional table with the x-axis being time and the y-axis being volume. Even though the volume and time pairs are illustrated in FIG. 6 as one data point, the volume and time pairs are recorded in memory as separate values, typically in a two-dimensional table in memory.

After enough volume and time pair measurements have been made, a control system that receives the dispensing events for fuel dispensers 32, such as the site controller 26 or tank monitor 32 for example, calculates what is known as a "maximum dispensing efficiency curve" 62. From this maximum dispensing efficiency curve 62, the control system can determine the maximum possible flow rate of a fuel dispenser 32 called the "maximum dispensing effidency." In turn, calculation of the maximum possible flow rate of a fuel dispenser 32 also allows the determination of the minimum possible dead time of a fuel dispenser 32 since a volume and time pair measurement for a fuel dispenser 32 using the dispensing events will always include some amount of "dead time" and the volume and time pairs that represent this maximum dispensing efficiency will have the minimum possible "dead time." Thus, the maximum dispensing efficiency as used herein can mean the maximum possible flow rate of the dispensing point 32, the minimum amount of "dead time" for the dispensing point 32, or both. The "maximum dispensing efficiency" calculation is used to detect the difference between true blockages and/or performance issues versus reduced flow rates caused by other means, such as the customer varying the flow rate via the nozzle 60, nozzle 60 snaps, or performance problems with the fuel pump used to pump fuel from the underground storage tank 34 to a fuel dispenser 32.

Figure 7:
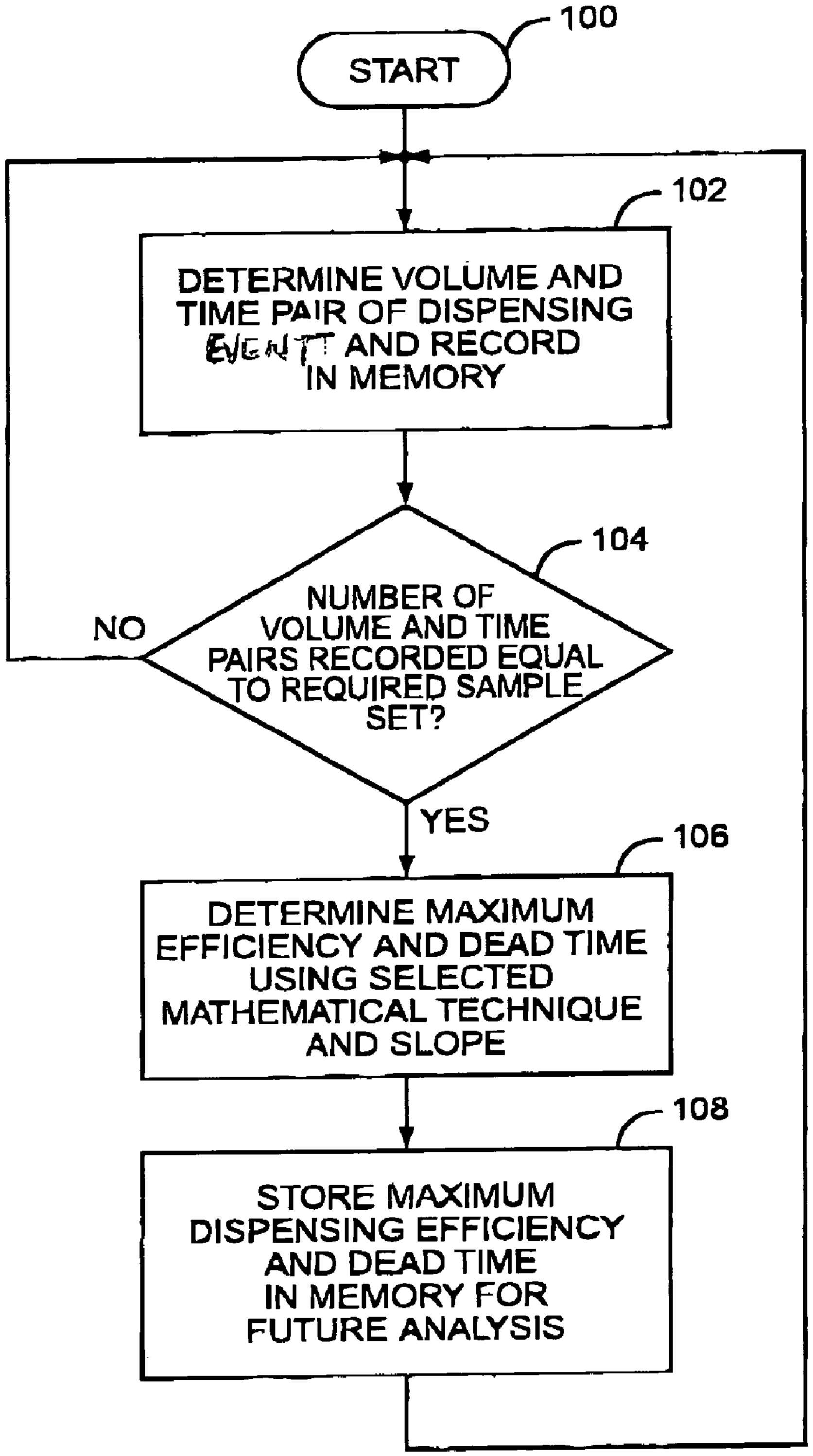
FIG. 7 is a flow chart diagram of one embodiment of a technique for determining a maximum dispensing efficiency curve of a dispensing point.

FIG. 7 is a flow chart outlining how a control system, such as the site controller 26 or tank monitor 36 for example, calculates the "maximum dispensing efficiency curve" 62 to then determine maximum possible flow rate and/or minimum possible dead time of a fuel dispenser 32. The discussion of the flow chart in FIG. 7 herein is made in tandem with the illustration in FIG. 6.

As illustrated in FIG. 7, the process starts (block 100), and the controller first calculates a plurality of volume and time pairs for a fuel dispenser 32 using the dispensing events. The volume measurement may be received from the volume of fuel measured by the fuel flow meter 52. The time is calculated as the elapsed time between the "Dispense Start" and "Dispense End" messages in the preferred embodiment (block 102). The control system, after each recorded volume and time pair for a fuel dispenser 32, will next determine if enough volume and time pair measurements have been recorded to provide a useful sample set of the dispensing activity of a fuel dispenser 32 (decision 104). If not, the process repeats by repeating volume and time pair measurement calculations for subsequent dispensing events at the fuel dispenser 32 until enough volume and time pair measurements have been made (block 102). The number of volume and time pair measurements required can be set by the control system and/or the programmer/designer of the control system, but in general, the determination of the maximum dispensing efficiency of a fuel dispenser 32 will be more accurate with a greater number of samples.

Note that since the measured volume and time pairs calculated for dispensing events at a fuel dispenser 32 are based on the volume of fuel measured by the fuel flow meter 52, the maximum dispensing efficiency can be determined for each fuel flow meter 52 that is present in a fuel dispenser 32 independently for fuel dispensers 32 that contain more than one fuel flow meter 52. Depending on configuration of the fuel dispenser 32, the fuel dispenser 32 may be capable of dispensing fuel to a vehicle at more than one "dispensing point." A "dispensing point" is present for each point at which fuel can be delivered from a fuel dispenser 32. For example, in the case of a three-product fuel dispenser 32 that is not a blending fuel dispenser, the fuel dispenser 32 will have three separate fuel flow meters 52—one for each of the three different grades of fuel. The fuel will either be delivered to its own dedicated separate hose 58 and nozzle 60, or to a single hose 58 and nozzle 60 that is coupled to each fuel flow meter 52.

In the above three hose 58 and nozzle 60 example, there are three dispensing points where a maximum dispensing efficiency can be calculated for each dispensing point independently. In the above one hose 58 example, there are still three fuel flow meters 52, but only one hose 58 and nozzle 60. This configuration only has one dispensing point, but three maximum dispensing efficiencies can still be calculated since there are three fuel flow meters 52. If the blockage is present in the hose 58 of such a fuel dispenser 32, all three maximum dispensing efficiencies calculated for each fuel flow meter 58 will be affected. If the blockage or performance problem is present before the fuel supply lines 47 from each of the fuel flow meters 52 are coupled to the single hose 58 and nozzle 60, then only the maximum dispensing efficiency for the fuel flow meter 52 with the blockage or performance problem will be affected.

Figure 8:
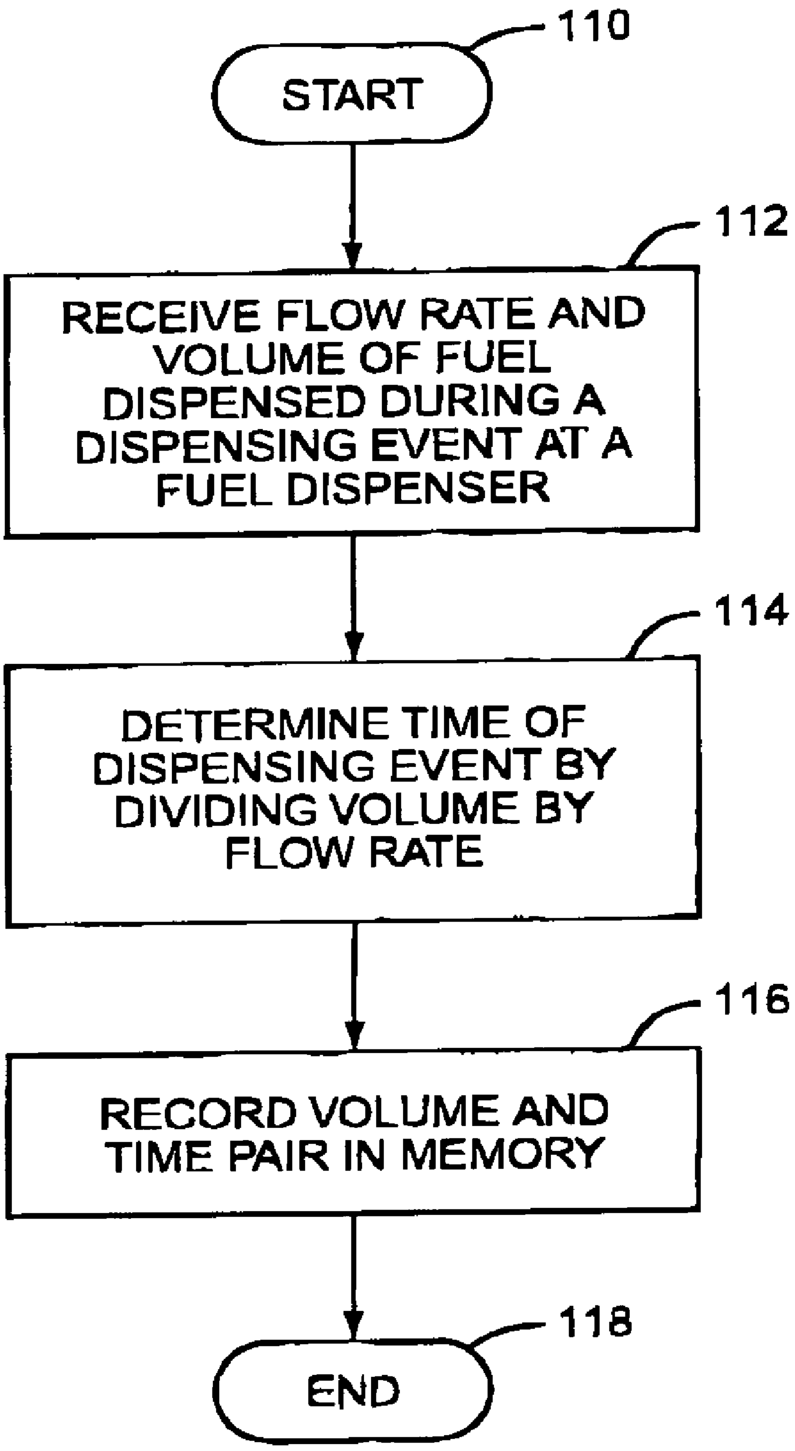
FIG. 8 is a flow chart diagram of an alterative embodiment of determining volume and time pair measurements to use in determining the maximum dispensing efficiency of a dispensing point.

If a fuel dispenser 32 has the capability of determining flow rates of its dispensing events, there is an alternative method of determining and recording volume and time pair measurements (block 102 in FIG. 7) for dispensing events to be used for determining the maximum dispensing efficiency curve 62. FIG. 8 illustrates a flow chart of this alternative embodiment that can be used in place of block 102 in FIG. 7. The process starts (block 110), and the control system receives the flow rate and the volume of fuel dispensed during a dispensing event at the fuel dispenser 32 for a dispensing point (block 112). For example, the flow rate may be 9.2 GPM and the volume may be 4.6 gallons Next, the control system determines the time over which the fuel was dispensed for the dispensing event by dividing the volume of fuel dispensed by the flow rate (block 104) (i.e. 4.6 gallons/9.2 GPM=0.5 minutes). Now, the control system has a volume and time pair for the dispensing event—4.6 gallons and 0.5 minutes and the control system records the volume and time pair in memory (block 116), and the process ends by returning back to block 104 in FIG. 7.

Determining volume and time pair measurements from this alternative embodiment is still useful in determining the maximum dispensing efficiency of a dispensing point 32. This is because if the dispensing point 32 is blocked, or is suffering from a performance problem, or if individual dispenses were performed at lower flow rates due to human or other cause, the flow rate calculated by the fuel dispenser 32 will be less than optimal and hence the volume and time pair measurement deduced from the calculated flow rate and volume information will represent a less than optimal dispensing event efficiency; however the maximum dispensing efficiency then calculated will represent the maximum attainable flow rate.

In summary, the present invention has the ability to determine a blockage and/or performance problem in a fuel dispenser 32 on a dispensing point by dispensing point basis. The application will refer to fuel dispenser 32 and dispensing point 32 interchangeably hereafter since the determination of the maximum dispensing efficiency is based on the dispensing point 32 of which a fuel dispenser 32 may have one or more.

Figure 1:
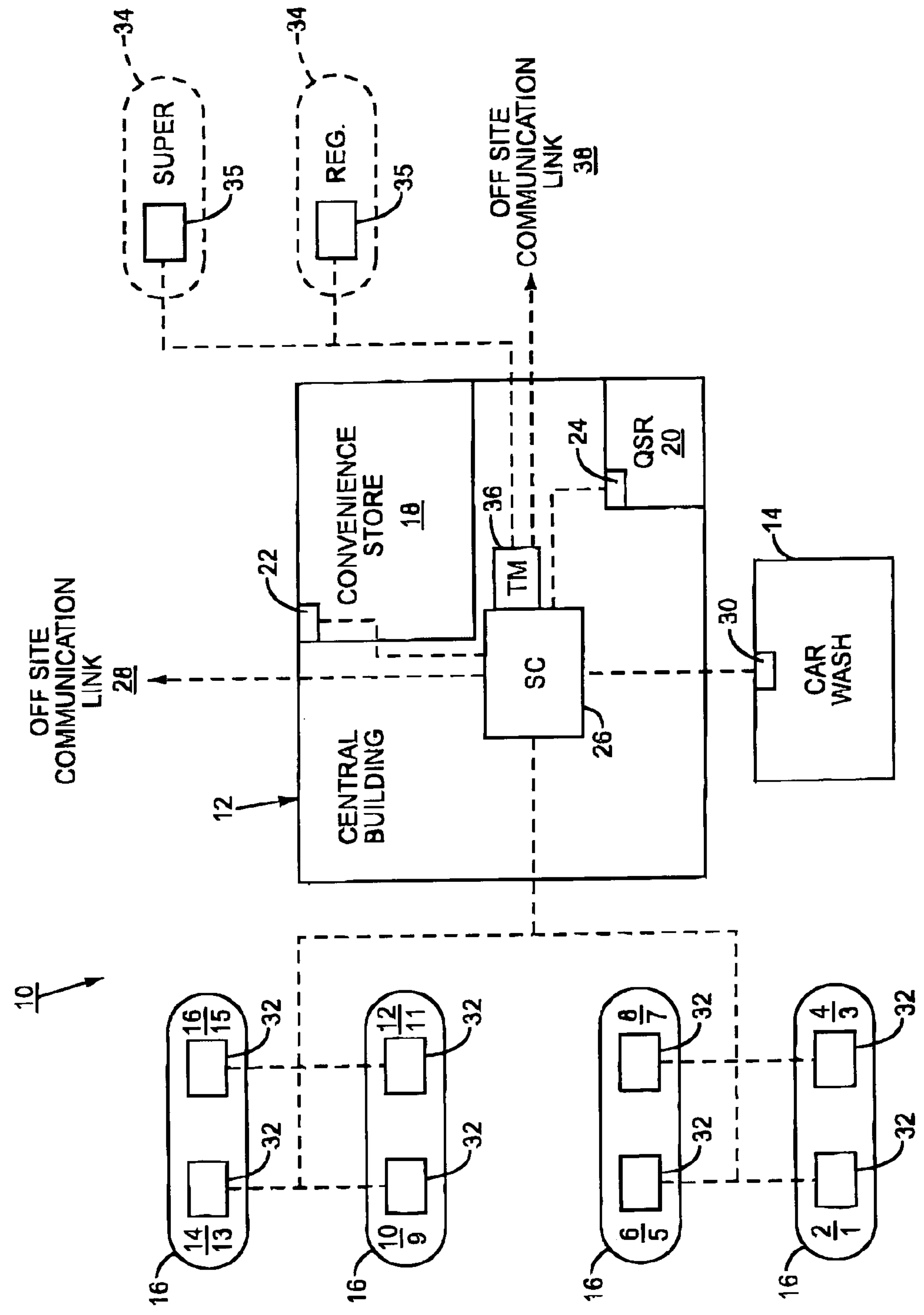
FIG. 1 PRIOR ART
FIG. 1 illustrates a conventional communication system within a fueling environment in the prior art.
Figure 2:
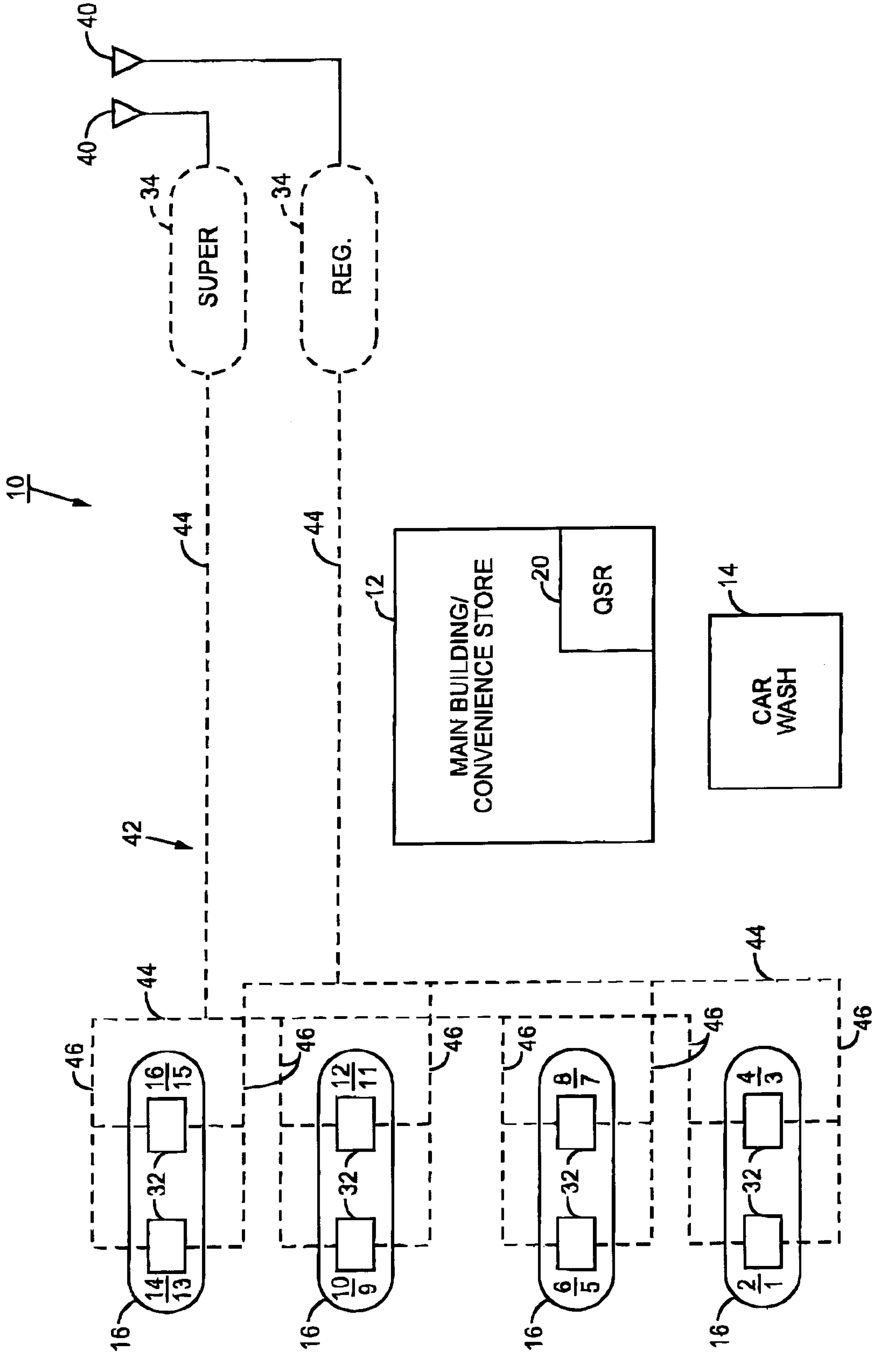
FIG. 2 PRIOR ART
FIG. 2 illustrates a conventional fueling path layout in a fueling environment in the prior art.
Figure 3:
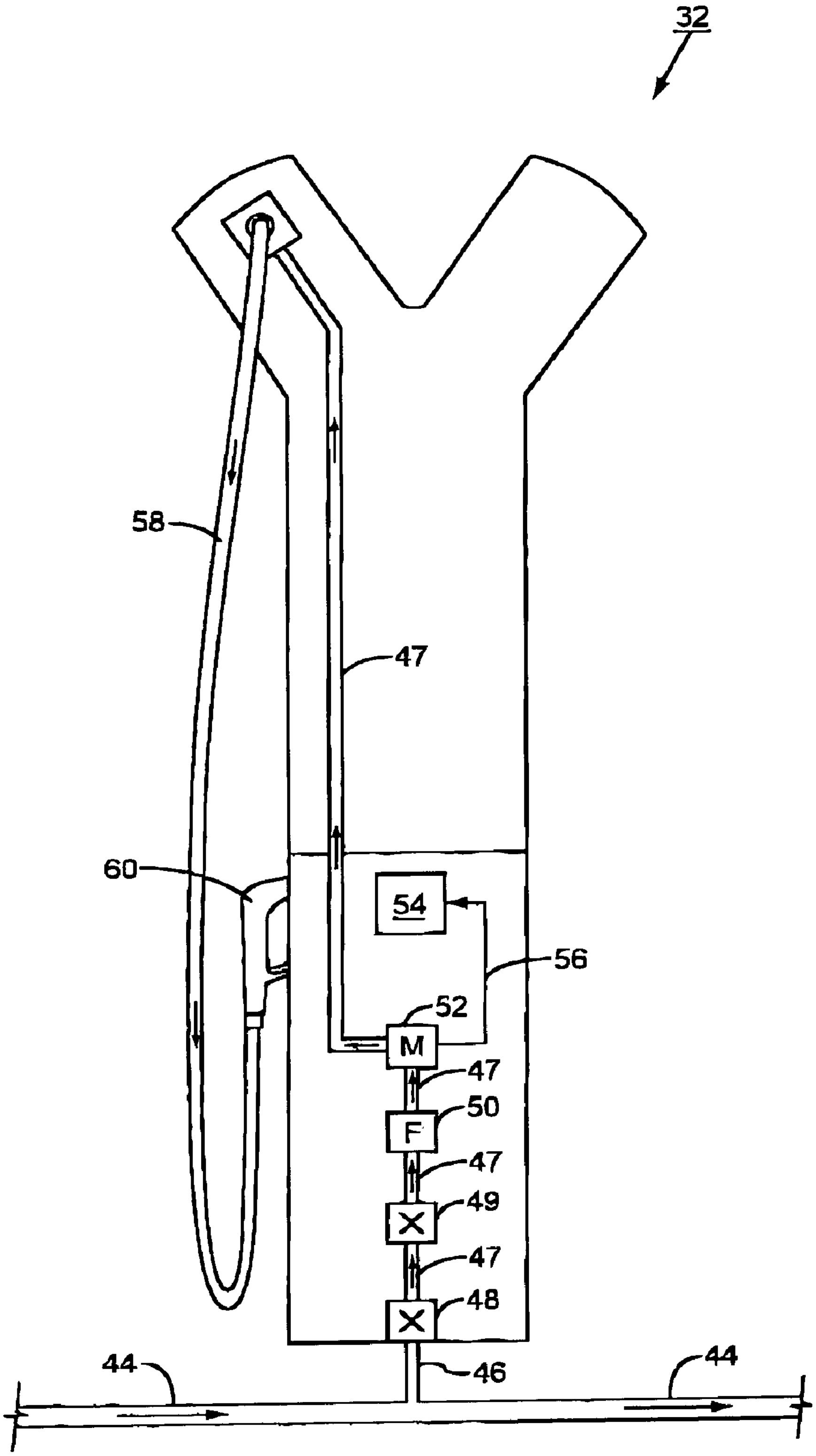
FIG. 3 PRIOR ART
FIG. 3 illustrates, according to an exemplary embodiment of the present invention, a fuel dispenser.
Figure 4:
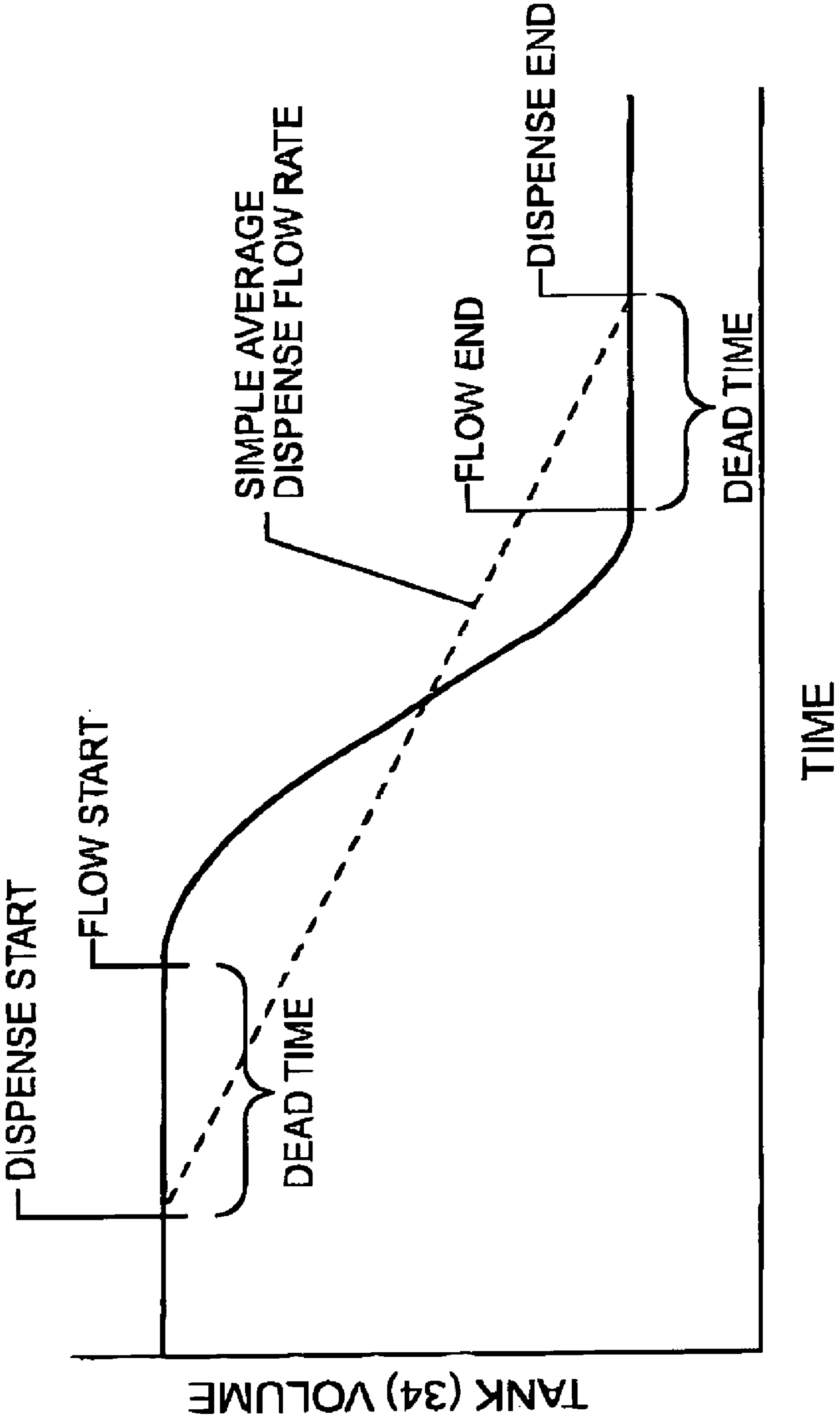
FIG. 4 illustrates an illustration of a typical dispensing event of volume versus time.
Figure 5:
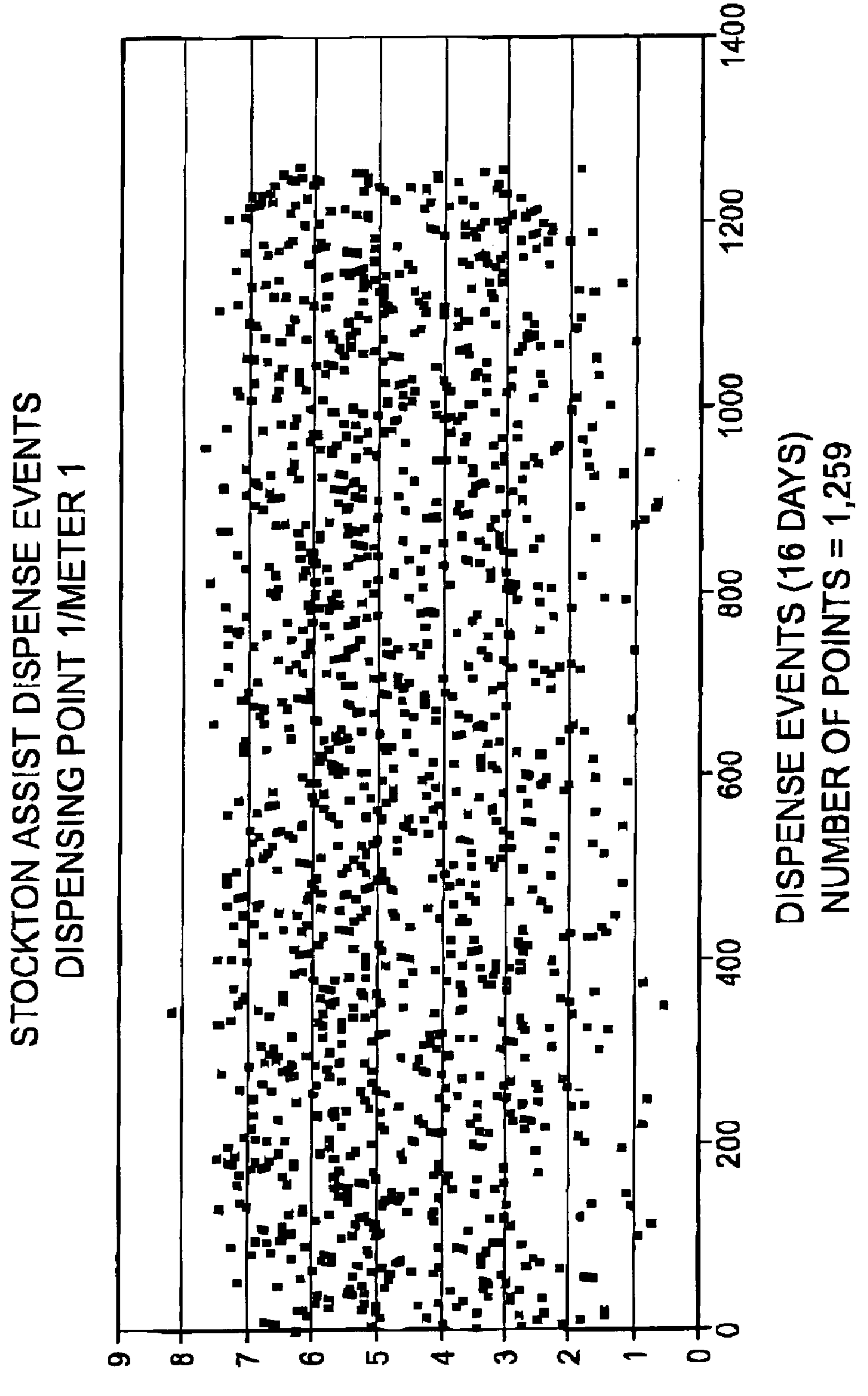
FIG. 5 illustrates a sample of dispensing point flow rates calculated from the volume and time pair measurements over a defined period of time.

After enough volume and time pair measurements for dispensing events at a dispensing point 32 have been accumulated and recorded, the control system determines the maximum dispensing efficiency of the dispensing point 32 (block 106). Each of these plurality of volume and time pair measurements for dispensing events of a dispensing point 32 can be represented in two-dimensional table of volume of fuel versus dispensing times, as illustrated in FIG. 6, or can be calculated and placed into a table in memory (not shown). Note that the volume and time pair measurements illustrated in FIG. 6 represent the same dispensing events that are illustrated in FIG. 5. The control system then determines a line that crosses through the subset of volume and time pair measurements from the plurality of volume and time pair measurements that represents dispensing events having sustained peak flow rates and minimum dead time. This line is referred to as the "maximum dispensing efficiency curve" 62. Any number of mathematical techniques may be used for finding the line of the maximum dispensing efficiency curve 62, as will be illustrated with further examples later in this application.

The slope and time axis intercept of this maximum dispensing efficiency curve 62 (8.3 GPM as illustrated in FIG. 6) are the maximum flow rate and minimum dead time, respectively, that occurred for the dispensing point 32 for the period of time over which the plurality of volume and time pair measurements occurred and therefore represent the "maximum dispensing efficiency" of the dispensing point 32. If enough volume and time pair measurement data are used, this maximum dispensing efficiency should be the same or almost the same as the true maximum dispensing efficiency that the dispensing point 32 is capable of achieving. Note that the maximum flow rate of 8.3 GPM illustrated in FIG. 6 is not the average flow rate of the dispensing point 32. Rather, it is the flow rate of the most efficient dispensing events that were carried out at the dispensing point 32 for the given sample of dispensing events analyzed where dead time was minimized and/or eliminated by the customer.

As shown in FIG. 6, the maximum dispensing efficiency curve 62 does not intersect the X-axis (the dispensing time) at zero This is because it is impossible for a customer to insert the nozzle 60 from the fuel dispenser 32 into a vehicle and begin fueling immediately at the same time as a dispensing point 32 is activated, and also to deactivate the dispensing point 32 at the same time as fueling is completed. In short, a fueling point 32 will always have some amount of "dead time" in fuel dispensers 32 that exist today. Since the customer is required to perform some additional step in addition to the nozzle 60 handle engaging and disengaging to activate and deactivate a dispensing point 32, it will always take more than zero amount of time to begin fueling after activation of a dispensing point 32, and more than zero amount of time to deactivate a dispensing point 32 after fueling is completed. The time where the maximum dispensing efficiency curve 62 intersects the X-axis is the "minimum dead time" that is present in the dispensing point 32 due to the aforementioned times between fuel dispensing and activation and deactivation of a dispensing point 32 that are always present in a dispensing event.

After the control system determines the maximum dispensing efficiency for a dispensing point 32, the control system stores this calculation for future analysis to detect if a blockage and/or performance issue exists within the dispensing point 32 (block 108). This process repeats as illustrated in FIG. 7.

Figure 9:
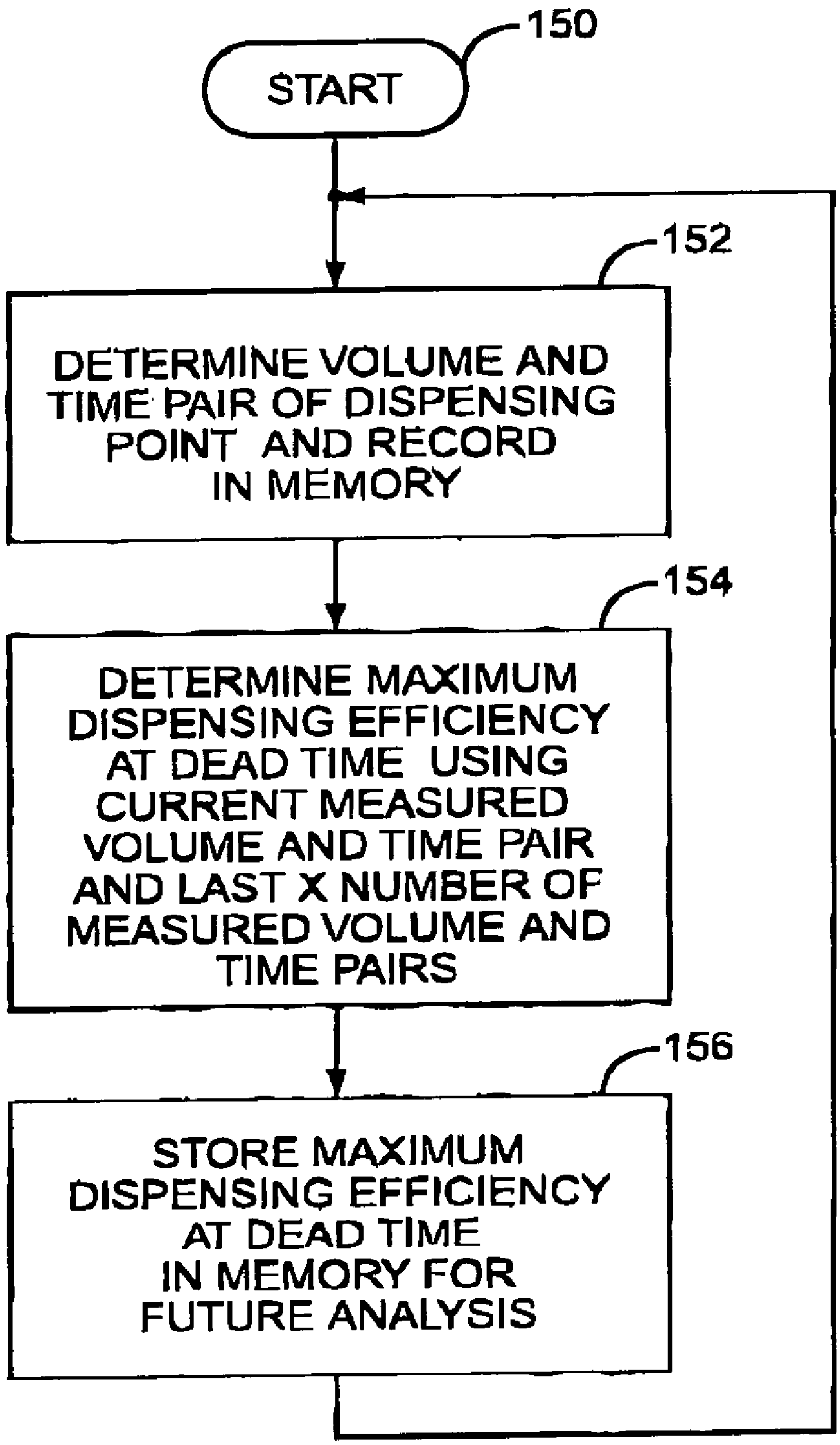
FIG. 9 illustrates a flow chart diagram of an alternative embodiment of how a maximum dispensing efficiency curve for a dispensing point is determined.

FIG. 9 illustrates an alternative embodiment to FIG. 7 for determining the maximum dispensing efficiency of a dispensing point 32. The difference between the example in FIG. 7 and the embodiment illustrated in FIG. 9 is that the FIG. 9 embodiment does not wait until there are enough volume and time pair measurements for a dispensing point 32 (decision 104) before determining the maximum dispensing efficiency of the dispensing point 32. Instead, the current volume and time pair measurement is combined with either all past, or a given number of past volume and time pair measurements for the dispensing point 32 to determine the maximum dispensing efficiency of a dispensing point 32. In this manner, the maximum dispensing efficiency curve 62 will continue to approach the true maximum dispensing efficiency of the dispensing point 32 as more volume and time pair measurements are used in such calculation.

Figure 10:
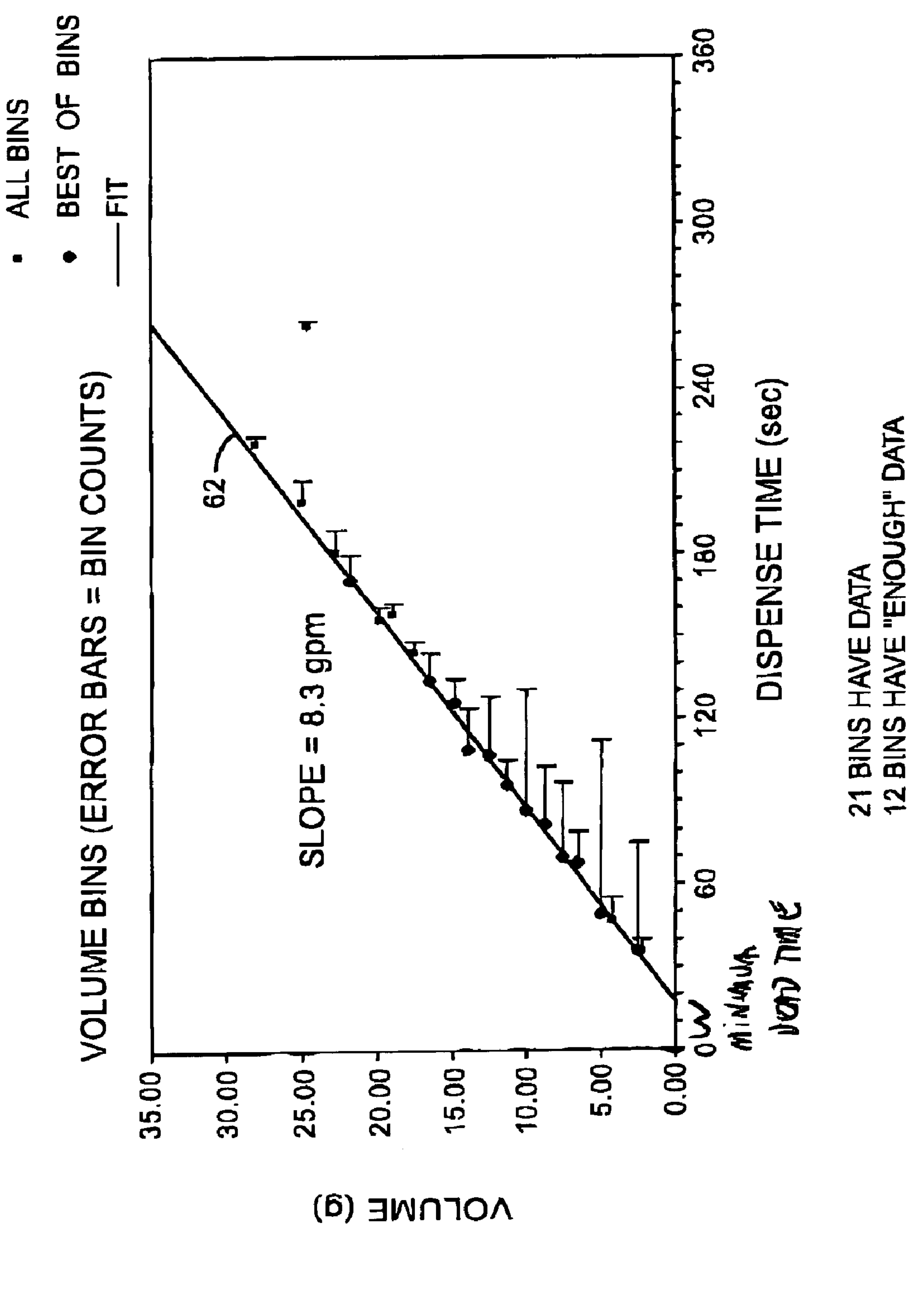
FIG. 10 illustrates an alternative embodiment of a maximum dispensing efficiency curve for a dispensing point using the "best of bins" mathematical technique.

FIG. 10 illustrates another example of a mathematical technique that may be used to determine the maximum dispensing efficiency of a dispensing point 32 (the process in block 106 in FIG. 7 and block 156 in FIG. 9). This technique is known as the "best of bins" technique. As before, a given number of volume and time pair measurements for a dispensing point 32 are determined as the volume and time pair measurement sample set to analyze. In the best of bins technique, only certain volume and time pair measurements from the data qualify to be used to determine the maximum dispensing efficiency curve 62. The volume and time pair measurements are first collected in what is known as "bins." Bins are set up to determine how many volume and time pair measurements from the sample set occurred within certain predefined ranges of volume. For example, one bin may be the volume and time pair measurements that occurred between 5 gal and 5.5 gal. As illustrated in FIG. 10, twenty-one total bins are used, and each of the volume and time pair measurements are arranged in their respective bins. The control system only uses volume and time pair measurements from bins that qualify or have enough data to determine the maximum dispensing efficiency of a dispensing point 32 located in bins that qualify or have enough data.

In FIG. 10, only twelve of the bins contained enough volume and time pair measurements to qualify to be used in determining the maximum dispensing efficiency of the dispensing point 32, In this manner, the calculation of the maximum dispensing efficiency does not use volume and time pair measurements from volume ranges that do not occur often. After the qualifying bins are determined, the control system determines maximum dispensing efficiency by using the fastest volume and time pair measurement from each qualifying bin to then determine the maximum dispensing efficiency curve 62 as described above (see block 106 in FIG. 7 and block 154 in FIG. 9).

Figure 11:
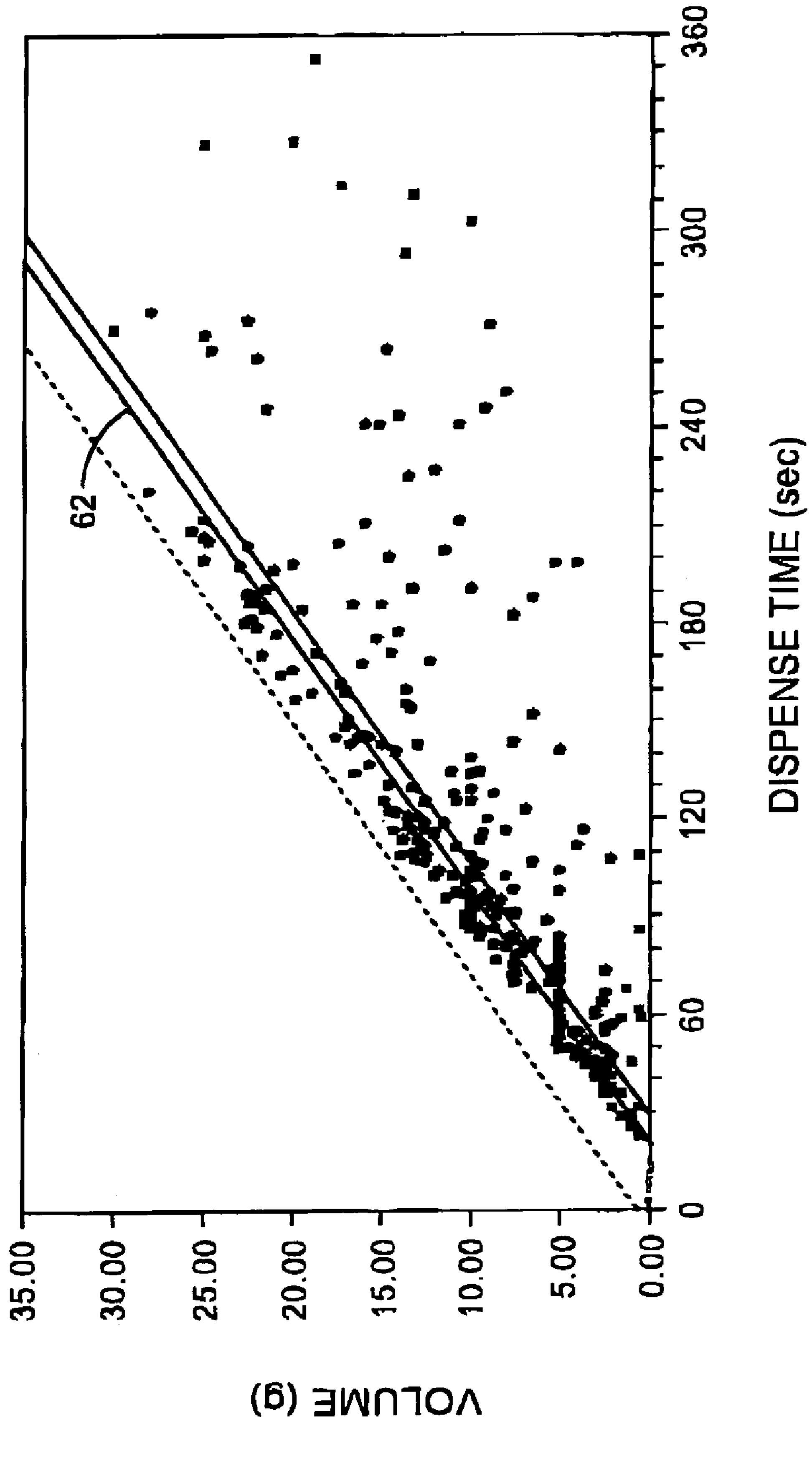
FIGS. 11 and 12 illustrate another alternative embodiment of a maximum dispensing efficiency curve for a dispensing point using the "iterative fit" mathematical technique.
Figure 12:
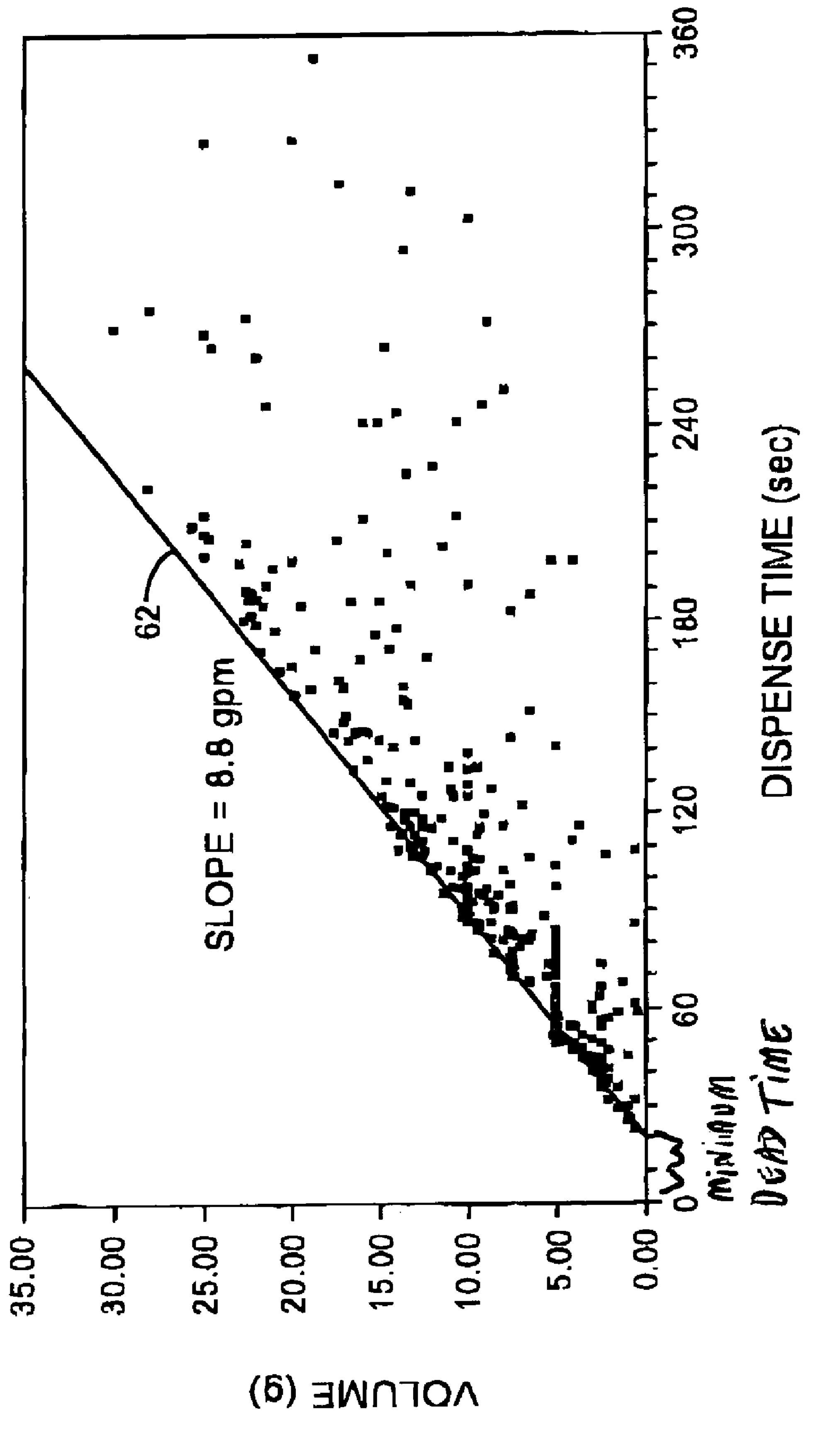

FIGS. 11 and 12 illustrate yet another mathematical technique for determining the maximum dispensing efficiency of a dispensing point 32 (the process in block 106 in FIG. 7 and block 154 in FIG. 9). This technique is known as the "iterative fit" technique. As before, a given number of volume and time pair measurements for a dispensing point 32 are determined as the volume and time pair measurement sample set to analyze. First, the control system pre-filters volume and time pair measurements for dispensing events to reject data outside defined limits and statistical outlier points in all volume, time and rate domains in order to simply eliminate absolutely known volume and time pairs that cannot possibly represent dispensing events where peak flow rate was delivered Next, the control system determines the maximum dispensing efficiency 62 by fitting a line to those volume and time pair measurements that represent the maximum flow rates for the dispensing point 32 and are the best fit to formulate a line, as discussed above in association with FIG. 6.

After the initial maximum dispensing efficiency curve 62 is determined, the control system determines boundary lines on each side of the initial maximum dispensing efficiency curve 62 based on the statistical variability in the volume and time pair measurements to determine all of the volume and time pair measurements that fit within the boundaries. The process of finding the best line fit to the volume and time pair measurements is then again repeated, but only using the events that fit within the previously determined boundaries and excluding all others. This process is repeated iteratively until one of several limits is reached. One limit goal is when the line fits the remaining points well based on the standard deviation of the residuals. Another limit could be to stop iterations when the slope of each successive fitted line stops changing by a determined significant amount. Yet another limit could be to stop iterations when the standard deviation of the residuals of each successive fitted line stops changing by a determined amount. After the iterative process is finished by reaching one of the limits defined, the maximum dispensing efficiency of the dispensing point 32 is determined as the slope of the finalized maximum dispensing efficiency curve 62 and the minimum dead time is determined as the time axis intercept.

FIG. 12 illustrates an example of the final maximum dispensing efficiency curve 62 that was calculated using the iterative fit mathematical technique on the volume and time pair measurements illustrated in FIG. 11. The calculated maximum dispensing efficiency for the example illustrated in FIGS. 11 and 12 is 8.8 GPM, as opposed to 8.3 GPM in FIGS. 6 and 10, even though all volume and time pair measurements were the same for each example.

Figure 13:
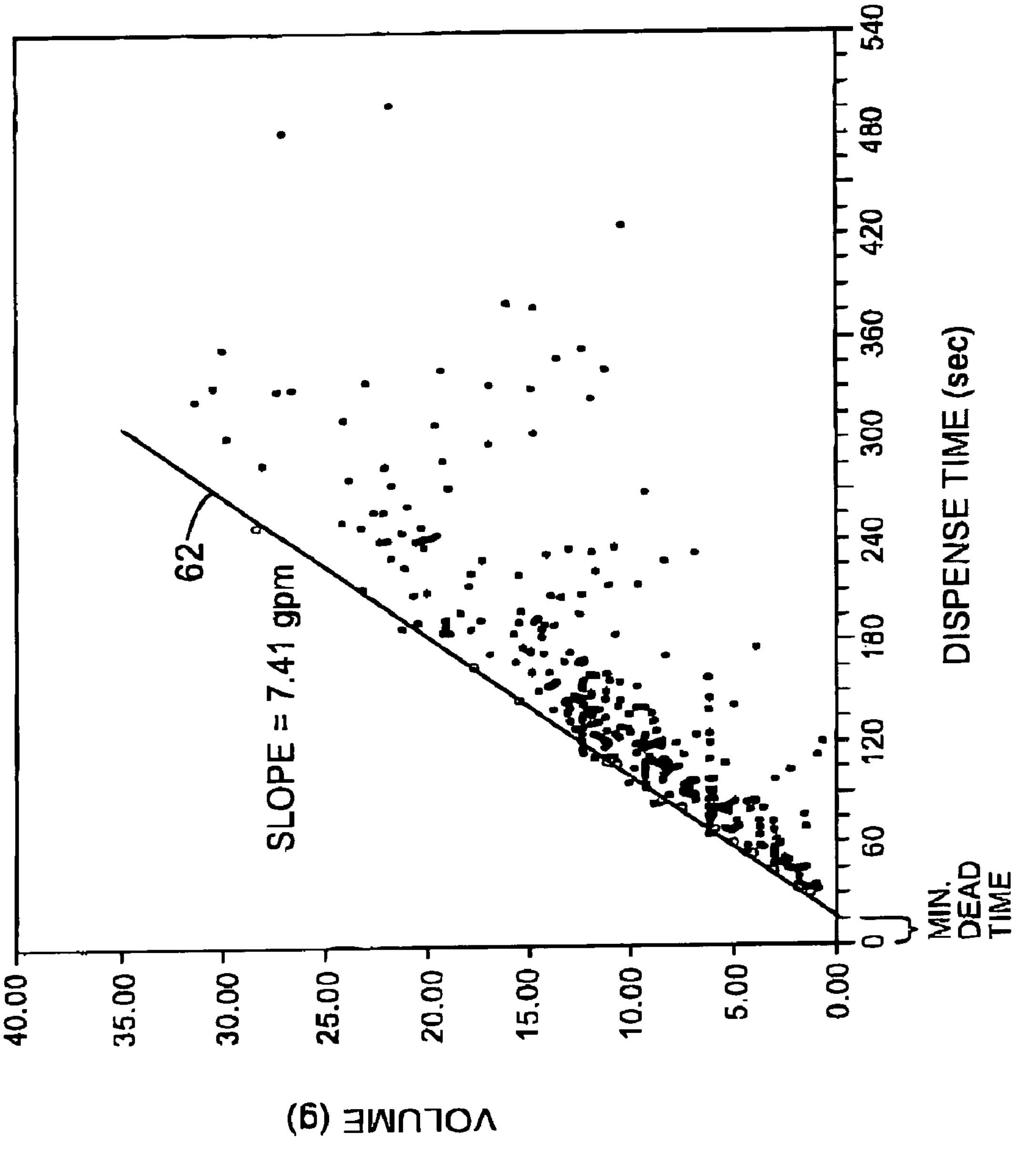
FIG. 13 an alternative embodiment of a maximum dispensing efficiency curve for a dispensing point using the "Hough" mathematical technique.
Figure 14:
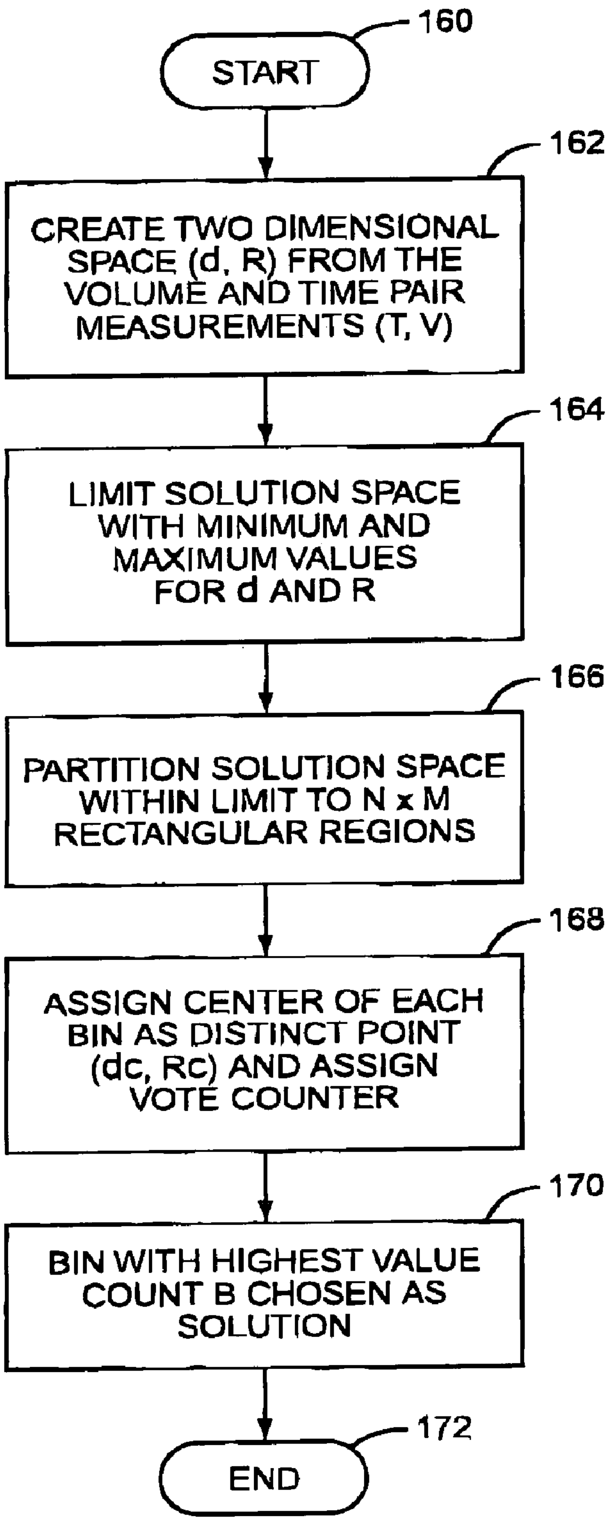
FIG. 14 is a flow chart diagram of an alternative embodiment of how a maximum dispensing efficiency curve for a dispensing point is determined using the "Hough" technique.

FIG. 13 illustrates the results of another technique that may be used in the present invention for determining the maximum dispensing efficiency curve 62 known as the "Hough" technique. The discussion of FIG. 13 will be made here in tandem with the flow chart diagram of FIG. 14 explaining how the Hough technique is used in accordance with another embodiment of the present invention. The process starts on FIG. 14 (block 160), and the control system creates a two-dimensional space (d, R) from the volume and time pair measurements (T, V) where 'd' is the dispensing dead time and 'R' is the dispensing rate (block 162). The relation between the (d, R) space and the (T, V) space can be expressed as:

$$R=V/(T-d)$$

Note that a point in (T, V) space actually maps to an infinite number of points in (d, R) space (it maps to a hyperbola). The time runs along the X-axis in both spaces, and Volume (in (T, V) space) and Rate (in (d, R) space) run along the Y-axis The Hough transform limits the solution space with minimum and maximum values for d and R (block 164), then partitions it into N×M rectangular regions (bins) (block 166). The center of each bin is a distinct point (dc, Rc). Each point (dc, Rc) has a vote counter assigned to it (block 168). In this example, the minimum and maximum values of the solution space are set by the physical system being modeled, and are usually on the order of R∈(0 gpm, 20 gpm) and d∈(0 seconds, 30 seconds). Usually, N is chosen so that the bins are 1 to 5 seconds wide, and M is chosen so that the bins are 0.1 to 1.0 GPM tall. These configuration parameters are configurable, and can change for different applications, such as diesel dispensers instead of gasoline dispensers, etc.

At this point, there are actually two different implementations of the Hough algorithm that may be used in this embodiment called the "Time Hough" and the "Rate Hough." For the "Time Hough" transform, the control system takes each point in the dispensing event volume and time space (T, V), iterates through all the valid values for "dc," maps the valid values to the Hough space (dc, Rc), and increments the vote counter at the location. For the "Rate Hough" transform, the control system takes each point in the dispensing event volume and time space (T, V), iterates through all the valid values for "Rc" (Rate Hough), maps the valid values to the Hough space (dc, Rc), and increments the vote counter at the location. In either case of the "Time Hough" transform or the "Rate Hough" transform, the control system determines the bin with the highest vote count and chooses this bin as the solution, and all the points in (T, V) space that voted for that bin by the control system are selected as the points on the maximum dispensing efficiency curve 62 (block 170), and the process ends (block 172).

In an alternate of this embodiment, the pair of bins (adjacent in 'd' for "Time Hough," and 'R' for "Rate Hough") with the highest combined vote count is selected by the control system Also, the control system may use the described "Hough" transforms as a filter to the volume and time pair measurements, rather than to obtain the maximum dispensing efficiency curve 62. After the volume and time pair measurements are filtered via the points selected from one of the aforementioned "Hough" transforms, the remaining volume and time pair measurements selected by the filtering are fed to a standard least-squared-error fit straight line algorithm, or any of the aforementioned techniques of fitting a line to volume and time pair measurements to determine the maximum dispensing efficiency curve 62.

It is also possible to provide pre-filtering to the volume and time pair measurements before such measurements are processed by a "Hough" transform in order to provide better data for the "Hough" Transform. The technique is known as a "Binning Algorithm," and may be used as a pre-processor on the volume and time pair measurements before a "Hough" transform is performed or before any of the previously described techniques for fitting a line through the volume and time pair measurements is made.

The binning algorithm can take on three forms according to the present invention: "Volume Binning," "Time Binning," and "Volume/Time Binning." The Volume Binning algorithm works by creating a series of bins representing ranges of dispensed volume in volume and time pair measurements (T, V) space. The control system then distributes all of the available volume and time pair measurements for dispensing events into these bins, and selects from each bin the dispensing event with the lowest time (T) value. The "Time Binning" algorithm works by creating a series of bins representing ranges of time (T) in the volume and time pair measurements (T, V) space. The control system then distributes all the available dispensing events into these bins, and selects from each bin the dispensing event with the highest volume (V) value. The Time/Volume Binning algorithm works by creating the union of points returned by the Volume Binning and Time Binning algorithms. This algorithm attempts to ameliorate the limitations of one algorithm by the other. After a binning algorithm is performed on the volume and time pair measurements, any of the aforementioned line fitting techniques may be used to determine the maximum dispensing efficiency curve 62.

Figure 15:
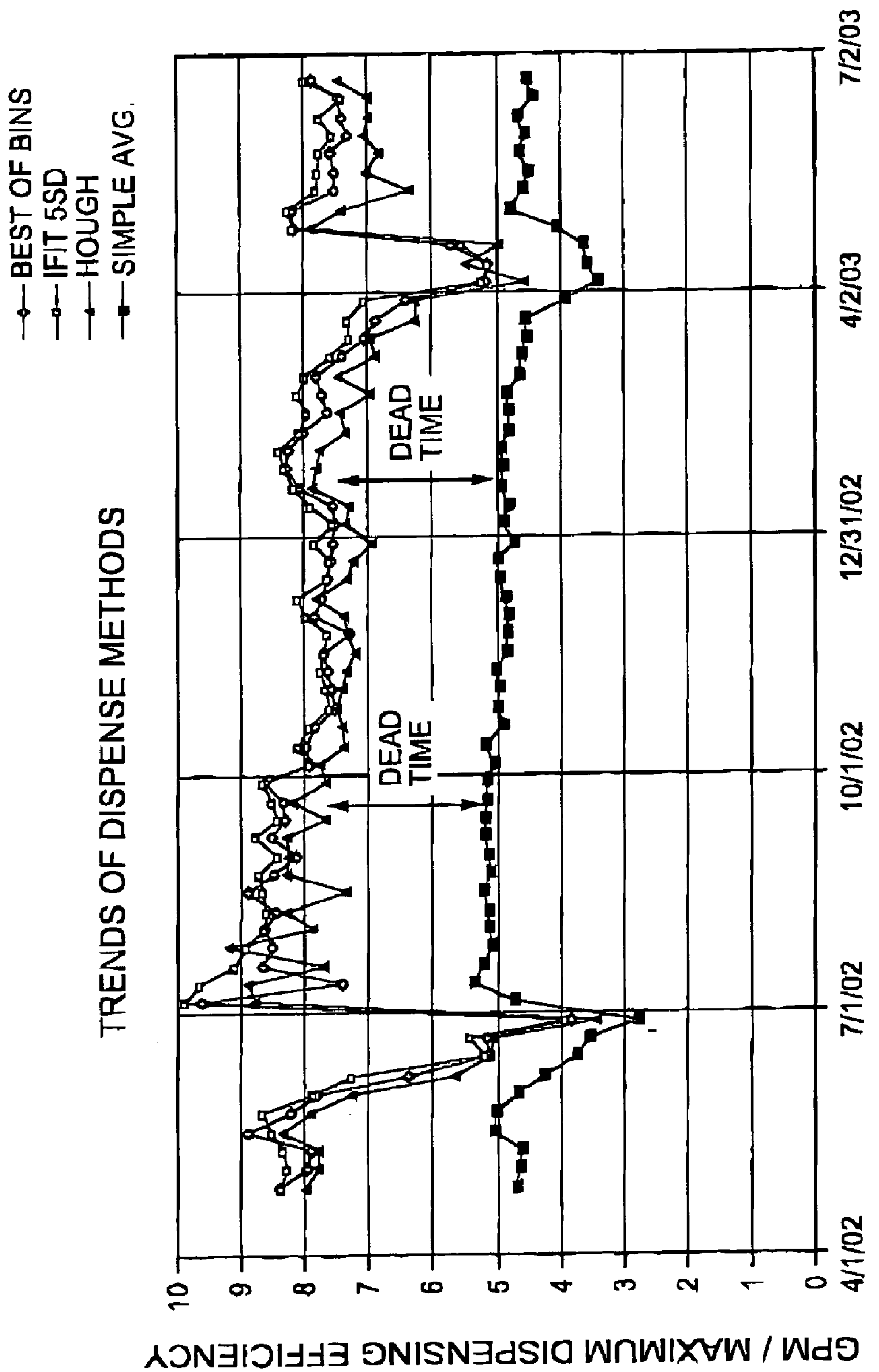
FIG. 15 is a graphical diagram of a comparison of maximum dispensing efficiency curves with a flow rate curve which includes the dead time of a dispensing event.

FIG. 15 illustrates the results of the previously described best of bins, iterative fit, and Hough techniques for determining the maximum dispensing efficiency of a dispensing point 32 at different periods of time for a dispensing point 32 versus using a simple average calculation of flow rates. As one can see from FIG. 15, there is a large difference between the maximum dispensing efficiency of a dispensing point 32, as calculated using the techniques of the present invention, and the dispensing point's simple average flow rate. The difference is accounted for in the dead time and possibly the intentional (automatic or manual) reduction of dispensing flow rates during dispensing. In the simple average flow rate, this analysis includes the dead time or reduced dispensing time or intentionally reduced flow rates of the dispenser and is therefore not a very accurate measurement of the true flow-rate capability of a dispensing point 32. In the best of bins, iterative fit, and Hough techniques that calculate a maximum dispensing efficiency of the dispensing point 32 rather than average flow rates, the results are much closer to the true flow rate capability of the dispensing point 32 since volume and time pair measurements from the sample set are not used in the calculation where dead time is more than the theoretical least amount of dead time possible or flow rate is less than the maximum possible flow rate in a dispensing event (if enough volume and time pair measurements are used).

Now that the maximum dispensing efficiency of a dispensing point 32 can be calculated, the control system can analyze the maximum dispensing efficiency of a dispensing point 32 to determine if the dispensing point 32 is experiencing a blockage or performance problem since the dead time in such calculation has theoretically been eliminated for all practical purposes. If the control system determines that the maximum dispensing efficiency of the dispensing point 32 is not as expected, the control system can take automated measures on its own to trigger an investigation of the dispensing point 32 so that any problems can be alleviated quickly and without having to wait until a service station operator or service personnel recognizes the problem manually or via customer complaints on slow dispensing point 32 throughput.

Figure 16:
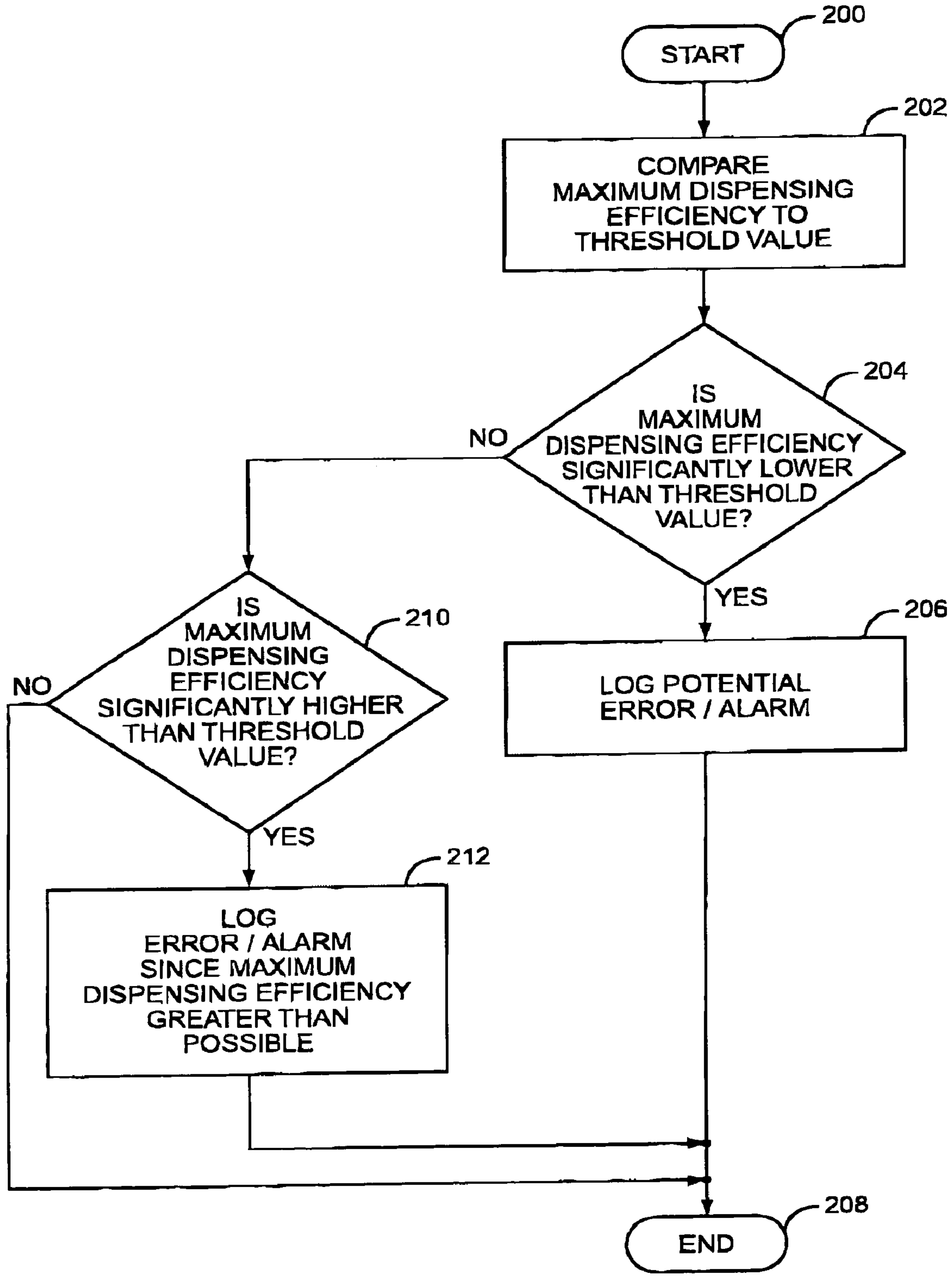
FIG. 16 is a flow chart diagram illustrating one embodiment of analyzing a maximum dispensing efficiency curve.

FIG. 16 is a flow chart illustrating a technique whereby the control system can determine if a blockage or performance issue exists with a dispensing point 32 using a calculated maximum dispensing efficiency, and then taking appropriate measures to correct the issue. The process starts (block 200), and the control system compares the previously determined maximum dispensing efficiency for a dispensing point 32 to a threshold value (block 202). The maximum dispensing efficiency can be the maximum possible flow rate for a dispensing point 32 from the slope of the maximum dispensing efficiency curve 62, the minimum amount of "dead time" for the dispensing point 32, or both. The control system next determines if the maximum dispensing efficiency is significantly lower than the threshold value (decision 204). If so, an error is generated, a log of the error is stored in memory, and the control system may generate an alarm to communicate to an operator at the service station 10 and/or to a remote system over the off-site communication link 28 (block 206) where thereafter the process ends (block 208). The definition of "significantly lower" in decision 204 may be any amount of difference between the maximum dispensing efficiency and the threshold value, and may be pre-stored in memory or calculated in real time. Further, the threshold value may be a function of historical maximum dispensing efficiencies for the dispensing point 32 being analyzed or other fuel dispensers 32, The goal of decision 204 is to determine if a dispensing point 32 has a blockage or a performance problem for a dispensing event by detecting an abnormality in the maximum dispensing efficiency for such a dispensing point 32.

If the maximum dispensing efficiency for the dispensing point 32 was not significantly lower than the threshold value in decision 204, the control system next determines if the maximum dispensing efficiency is significantly higher than the threshold value (decision 210). The threshold value in this instance is selected such that a positive answer to decision 210 means that the maximum dispensing efficiency calculated is higher than possible and therefore an error condition exists that should be logged and/or reported via an alarm (block 212). If the answer to decision 210 is negative, this means that the maximum dispensing efficiency was not either greater than normal or lower than normal and thus no error or alarm conditions exists—i.e. a blockage or performance problem does not exist.

Figure 17:
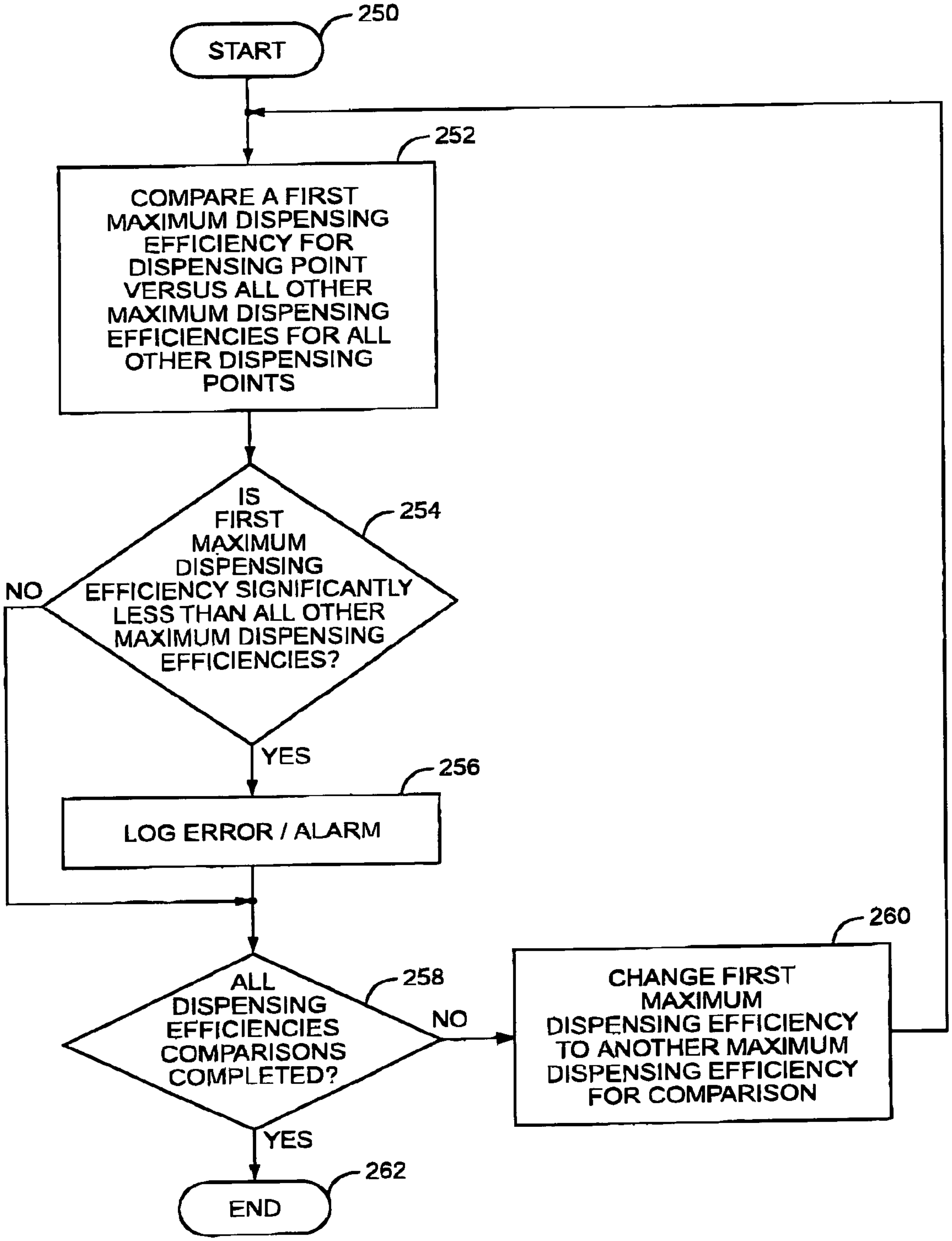
FIG. 17 is a flow chart diagram illustrating an alternative embodiment of analyzing a maximum dispensing efficiency curve.

FIG. 17 is a flowchart diagram of an alternative embodiment of the control system analyzing the calculated maximum dispensing efficiency to determine if a blockage and/or performance problem exists at a dispensing point 32. In this embodiment, the process starts (block 250), and then a first maximum dispensing efficiency of a dispensing point 32 is compared against all other calculated dispensing efficiencies for the all other dispensing points 32 (block 252). The maximum dispensing efficiency can be the maximum possible flow rate for a dispensing point 32 from the slope of the maximum dispensing efficiency curve 62, the minimum amount of "dead time" for the dispensing point 32, or both. If the first maximum dispensing efficiency for the dispensing point 32 is significantly less than all other maximum dispensing efficiencies for all of the other dispensing points 32 (decision 254), the control system logs an error and/or generates an alarm as previously discussed in the flow chart in FIG. 16 (block 256) If not, the control system makes a determination that the first maximum dispensing efficiency for the dispensing point 32 does not contain a blockage and/or performance problem, since the first maximum dispensing efficiency is higher than at least one other maximum dispensing efficiency for another dispensing point 32. The control system performs the same process in blocks 252–256 until all dispensing points 32 are compared (decision 258 and block 260), in which case the process ends (block 262).

The process in FIG. 17 may not be able to determine a performance issue with a dispensing point 32 if the performance problem exists for all dispensing points 32. For example, if the submersible turbine pump in the underground storage tank 34 is pumping fuel at an abnormally low flow rate, this will generate a lower flow rate at all dispensing points 32 that receive fuel from the underground storage tank 34 with the problematic submersible turbine pump equally.

Figure 18:
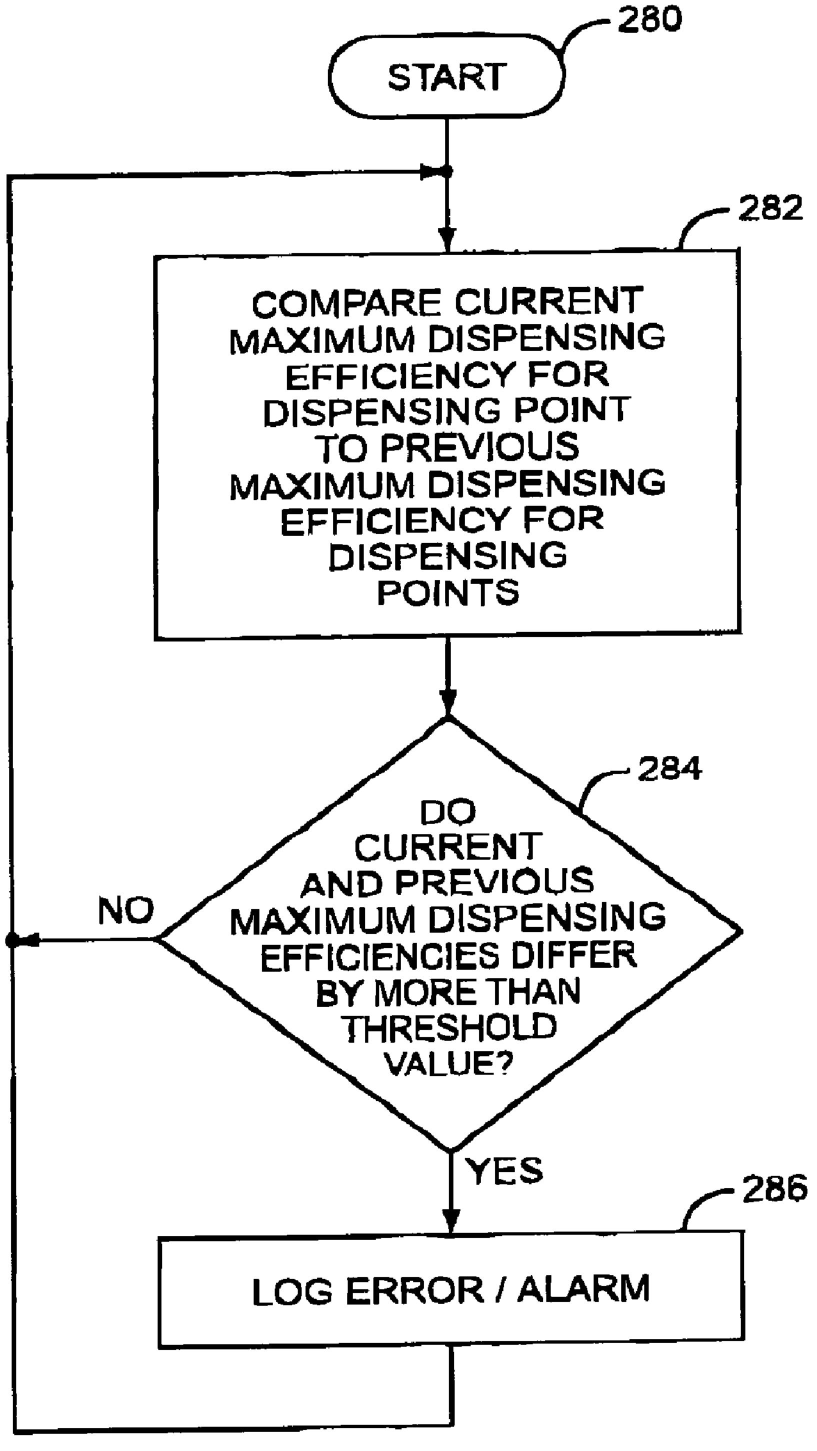
FIG. 18 is a flow chart diagram illustrating another alternative embodiment of analyzing a maximum dispensing efficiency curve.

FIG. 18 illustrates a flowchart of yet another embodiment of the control system analyzing the calculated maximum dispensing efficiency to determine if a blockage and/or performance problem exists at a dispensing point 32. In this embodiment, the control system compares a current maximum dispensing efficiency for a dispensing point 32 to a previous maximum dispensing efficiency calculated for the same dispensing point 32 in the past (block 282). The previous maximum dispensing efficiency may be the immediately preceding calculated maximum dispensing efficiency for the dispensing point 32, or may be an average or statistical analysis of a plurality of prior calculated maximum dispensing efficiencies for the dispensing point 32. If the current maximum dispensing efficiency and the previous maximum dispensing efficiency or efficiencies differ by more than a threshold value (decision 284), the control system logs an error and/or generates an alarm to indicate that the dispensing point 32 has a blockage and/or performance problem, since the dispensing efficiency has changed from what it has historically been (block 286), and the process continues to repeat whether as a result of logging an error and/or alarm (block 286), or if the answer to decision 284 is negative.

Those skilled in the art will recognize improvements and modifications to the preferred embodiments of the present invention. All such improvements and modifications are considered within the scope of the concepts disclosed herein and the claims that follow.

What is claimed is:

1. A flow rate monitoring system, comprising:

a fuel dispenser comprising a dispensing point and a meter that measures a volume of fuel dispensed at said dispensing point during a dispensing event wherein said fuel dispenser generates dispensing events; and a control system coupled to said meter to receive data regarding said volume of fuel dispensed at said dispensing point and receive said dispensing events to determine a time over which said volume of fuel was dispensed to formulate a volume and time pair measurement for a dispensing event;

said control system adapted to:

determine a plurality of said volume and dine pair measurements for a plurality of dispensing events at a dispensing point;

determine a maximum dispensing efficiency curve from said plurality of volume and time pair measurements; and determine a maximum dispensing efficiency of said dispensing point by determining a slope of said maximum dispensing efficiency curve.

2. The system of claim 1 wherein said slope is an estimate of the maximum possible flow rate of said dispensing point.

3. The system of claim 1 wherein said control system determines said maximum dispensing efficiency curve by:

determining a linear curve that best matches the volume and time pair measurements exhibiting the lowest time for dispensed volume in said plurality of volume and time pair measurements; and determining a slope of said linear curve.

4. The system of claim 3 wherein said control system uses a best of bins mathematical technique to determine said linear curve.

5. The system of claim 3 wherein said control system uses an iterative fit mathematical technique to determine said linear curve.

6. The system of claim 3 wherein said control system determines the minimum dead time for said dispensing point by determining the time period at which said linear curve dispensed volume becomes zero.

7. The system of claim 3 wherein said volume and time pair measurements are comprised of a two-dimensional table in a memory where one dimension of said table is volume and another dimension of said table is time.

8. The system of claim 1 wherein said control system is further adapted to compare said maximum dispensing efficiency to a threshold value; and generate an error if said maximum dispensing efficiency is less than said threshold value.

9. The system of claim 8 wherein said control system generates an alarm in response to generating said error.

10. The system of claim 9 wherein said control system generates said alarm by sending an alarm message over an off-site communication link.

11. The system of claim 1 wherein said control system compares said maximum dispensing efficiency to a threshold value; and generates an error if said maximum dispensing efficiency is more than said threshold value.

12. The system of claim 1 wherein said control system determines a current volume and time pair measurement of said dispensing event at said dispensing point and uses said current volume and time pair measurement and said plurality of volume and time pair measurements to determine said maximum dispensing efficiency.

13. The system of claim 1 wherein said control system:

determines a plurality of said maximum dispensing efficiency curves each for a plurality of dispensing points;

compares one of said maximum dispensing efficiencies to each of the other of said maximum dispensing efficiencies; and generates an error if said one of said maximum dispensing efficiencies is less than said other of said maximum dispensing efficiencies.

14. The system of claim 13 wherein said control system generates an alarm in response to generating said error.

15. The system of claim 14 wherein said control system generates said alarm by sending an alarm message over an off-site communication link.

16. The system of claim 1 wherein said control system:

determines a current maximum dispensing efficiency for said dispensing point for a different time span than for said maximum dispensing efficiency for said dispensing point by:

determining a plurality of volume and time pair measurements for a plurality of dispensing events at a dispensing point;

determining a maximum dispensing efficiency curve from said plurality of volume and time pair measurements; and determining a maximum dispensing efficiency of said dispensing point by determining the slope of said maximum dispensing efficiency curve;

compares said current maximum dispensing efficiency to said maximum dispensing efficiency; and generates an error if said current maximum dispensing efficiency is different than said maximum dispensing efficiency by more than a defined threshold value.

17. The system of claim 16 wherein said step of generating an error further comprises generating an alarm.

18. The system of claim 17 wherein said step of generating an alarm further comprises sending an alarm message over an off-site communication link.

19. A flow rate monitoring system, comprising:

a fuel dispenser comprising a dispensing point and a meter that measures a volume of fuel dispensed at said dispensing point during a dispensing event wherein said fuel dispenser generates dispensing events; and a control system coupled to said meter to receive data regarding said volume of fuel dispensed at said dispensing point and receive said dispensing events to determine a time over which said volume of fuel was dispensed to formulate a volume and time pair measurement for a dispensing event;

said control system adapted to:

determine a plurality of said volume and time pair measurements for a plurality of dispensing events at said dispensing point; and determine a dispensing efficiency curve of said dispensing point from said plurality of volume and time pair measurements;

determine the dispensing efficiency of said dispensing point by determining the slope of said dispensing efficiency curve; and determine the dead time of said dispensing point from said dispensing efficiency.

20. The system of claim 19, wherein said control system determines the maximum flow rate of said dispensing point from said dispensing efficiency.

21. A method of determining the dispensing efficiency of a dispensing point on a fuel dispenser, comprising the steps of:

measuring a volume of fuel dispensed at the dispensing point and the corresponding time period of a dispensing event at the dispensing point using a meter;

receiving data regarding said volume of fuel dispensed at the dispensing point from said meter;

receiving said dispensing events to determine a time over which said volume of fuel was dispensed to formulate a volume and time pair measurement for a dispensing transaction;

determining a plurality of said volume and time pair measurements for a plurality of dispensing events at the dispensing point;

determining a maximum dispensing efficiency curve from said plurality of volume and time pair measurements; and determining a maximum dispensing efficiency of the dispensing point by determining a slope of said maximum dispensing efficiency curve.

22. The method of claim 21 wherein said slope is an estimate of the maximum possible flow rate of the dispensing point.

23. The method of claim 21 wherein said step of determining said maximum dispensing efficiency curve further comprises:

determining a linear curve that best matches the volume and time pair measurements exhibiting the lowest time for dispensed volume in said plurality of volume and time pair measurements; and determining a slope of said linear curve.

24. The method of claim 23 wherein said step of determining a linear curve is determined using a best of bins mathematical technique.

25. The method of claim 23 wherein said step of determining a linear curve is determined using an iterative fit mathematical technique.

26. The method of claim 23, further comprising determining the minimum dead time for the dispensing point by determining the time period at which said linear curve dispensed volume becomes zero.

27. The method of claim 23 wherein said volume and time pair measurements are comprised of a two-dimensional table in a memory where one dimension of said table is volume and another dimension of said table is time.

28. The method of claim 21, further comprising:

comparing said maximum dispensing efficiency to a threshold value; and generating an error if said maximum dispensing efficiency is less than said threshold value.

29. The method of claim 28, further comprising generating an alarm in response to generating said error.

30. The method of claim 29 wherein said step of generating an alarm comprises sending an alarm message over an off-site communication link.

31. The method of claim 21, further comprising:

comparing said maximum dispensing efficiency to a threshold value; and generating an error if said maximum dispensing efficiency is more than said threshold value.

32. The method of claim 21, further comprising:

determining a current volume and time pair measurement of said dispensing event at the dispensing point; and using said current volume and time pair measurement and said plurality of volume and time pair measurements to determine said maximum dispensing efficiency.

33. The method of claim 21, further comprising:

determining a plurality of said maximum dispensing efficiency curves each for a plurality of dispensing points;

comparing one of said maximum dispensing efficiencies to each of the other of said maximum dispensing efficiencies; and generating an error if said one of said maximum dispensing efficiencies is less than said other of said maximum dispensing efficiencies.

34. The method of claim 33 further comprising generating an alarm in response to generating said error.

35. The method of claim 34 wherein said step of generating an alarm comprises sending an alarm message over an off-site communication link.

36. The method of claim 21, further comprising:

determining a current maximum dispensing efficiency for the dispensing point for a different time span than for said maximum dispensing efficiency for the dispensing point by:

determining a plurality of volume time pair measurements for a plurality of dispensing events at a dispensing point;

determining a maximum dispensing efficiency curve from said plurality of volume and time pair measurements; and determining a maximum dispensing efficiency of the dispensing point by determining the slope of said maximum dispensing efficiency curve;

comparing said current maximum dispensing efficiency to said maximum dispensing efficiency; and generating an error if said current maximum dispensing efficiency is different than said maximum dispensing efficiency by more than a defined threshold value.

37. The method of claim 36 wherein said step of generating an error further comprises generating an alarm.

38. The method of claim 37 wherein said step of generating an alarm further comprises sending an alarm message over an off-site communication link.

* * * * *

UNITED STATES PATENT AND TRADEMARK OFFICE

CERTIFICATE OF CORRECTION

PATENT NO. : 6,975,964 B2
DATED : December 13, 2005
INVENTOR(S) : Donald S. Reichler et al.

It is certified that error appears in the above-identified patent and that said Letters Patent is hereby corrected as shown below:

Column 16,
Line 65, change “dine” to -- time --.

Signed and Sealed this

Eighteenth Day of April, 2006

JON W. DUDAS
*Director of the United States Patent and Trademark Office*